(12) United States Patent
Padmanabhan et al.

(10) Patent No.: US 9,172,603 B2
(45) Date of Patent: Oct. 27, 2015

(54) WAN OPTIMIZER FOR LOGICAL NETWORKS

(71) Applicant: Nicira, Inc., Palo Alto, CA (US)

(72) Inventors: Amar Padmanabhan, Menlo Park, CA (US); Ronghua Zhang, San Jose, CA (US); Pankaj Thakkar, Santa Clara, CA (US); Teemu Koponen, San Francisco, CA (US); Martin Casado, Portola Valley, CA (US)

(73) Assignee: NICIRA, INC., Palo Alto, CA (US)

( * ) Notice: Subject to any disclaimer, the term of this patent is extended or adjusted under 35 U.S.C. 154(b) by 3 days.

(21) Appl. No.: 13/678,512

(22) Filed: Nov. 15, 2012

(65) Prior Publication Data

US 2013/0121209 A1    May 16, 2013

Related U.S. Application Data

(60) Provisional application No. 61/560,279, filed on Nov. 15, 2011.

(51) Int. Cl.
*H04L 12/24* (2006.01)
*G06F 9/455* (2006.01)
(Continued)

(52) U.S. Cl.
CPC ............ *H04L 41/0806* (2013.01); *G06F 9/455* (2013.01); *G06F 9/45533* (2013.01);
(Continued)

(58) Field of Classification Search
CPC ... H04L 63/08; H04L 63/306; H04L 63/0281; H04L 45/72; H04L 49/70; H04L 12/2424; H04L 41/0803; H04L 41/0823; H04L 41/0806; H04L 41/0893; H04L 41/0813; H04L 41/0889; H04L 61/2517; H04L 61/2521; H04L 61/256; H04L 67/1008; H04L 45/74; H04L 63/0218; G06F 9/45533; G06F 9/455; G06F 15/177
USPC ......... 370/389, 401, 235, 252, 255, 236, 254, 370/230.1, 390, 315; 709/203, 247
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| AU | 2012340383 | 4/2014 |
| AU | 2012340387 | 4/2014 |

(Continued)

OTHER PUBLICATIONS

WO 2013/074847 with International Search Report, May 23, 2013, Nicira, Inc.

(Continued)

*Primary Examiner* — Kwang B Yao
*Assistant Examiner* — Ricardo Castaneyra
(74) *Attorney, Agent, or Firm* — Adeli LLP

(57) ABSTRACT

Some embodiments provide a non-transitory machine readable medium of a controller of a network control system for configuring a wide area network (WAN) optimizer instance to implement a WAN optimizer for a logical network. The controller receives a configuration for the WAN optimizer to optimize network data from the logical network for transmission to another WAN optimizer. The controller identifies several other controllers in the network control system on which to implement the logical network. The controller distributes the configuration for implementation on the WAN optimizer.

23 Claims, 11 Drawing Sheets

(51) Int. Cl.
*H04L 29/06* (2006.01)
*H04L 12/741* (2013.01)
*G06F 15/177* (2006.01)
*H04L 29/12* (2006.01)
*H04L 12/931* (2013.01)
*H04L 29/08* (2006.01)

(52) U.S. Cl.
CPC .......... *G06F15/177* (2013.01); *H04L 12/2424* (2013.01); *H04L 41/0803* (2013.01); *H04L 41/0813* (2013.01); *H04L 41/0823* (2013.01); *H04L 41/0889* (2013.01); *H04L 41/0893* (2013.01); *H04L 45/74* (2013.01); *H04L 49/70* (2013.01); *H04L 61/2503* (2013.01); *H04L 61/256* (2013.01); *H04L 61/2517* (2013.01); *H04L 61/2521* (2013.01); *H04L 63/0218* (2013.01); *H04L 67/1008* (2013.01)

(56) References Cited

U.S. PATENT DOCUMENTS

| | | | |
|---|---|---|---|
| 5,751,967 | A | 5/1998 | Raab et al. |
| 6,104,699 | A | 8/2000 | Holender et al. |
| 6,353,614 | B1 | 3/2002 | Borella et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,785,843 | B1 | 8/2004 | McRae et al. |
| 6,880,089 | B1 | 4/2005 | Bommareddy et al. |
| 7,046,630 | B2 | 5/2006 | Abe et al. |
| 7,055,173 | B1 | 5/2006 | Chaganty et al. |
| 7,197,572 | B2 | 3/2007 | Matters et al. |
| 7,209,439 | B2 | 4/2007 | Rawlins et al. |
| 7,283,473 | B2 | 10/2007 | Arndt et al. |
| 7,342,916 | B2 | 3/2008 | Das et al. |
| 7,450,598 | B2 | 11/2008 | Chen et al. |
| 7,478,173 | B1 | 1/2009 | Delco |
| 7,512,744 | B2 | 3/2009 | Banga et al. |
| 7,555,002 | B2 | 6/2009 | Arndt et al. |
| 7,606,260 | B2 | 10/2009 | Oguchi et al. |
| 7,627,692 | B2 | 12/2009 | Pessi |
| 7,649,851 | B2 | 1/2010 | Takashige et al. |
| 7,706,266 | B2* | 4/2010 | Plamondon ................ 370/230 |
| 7,710,874 | B2 | 5/2010 | Balakrishnan et al. |
| 7,730,486 | B2 | 6/2010 | Herington |
| 7,764,599 | B2 | 7/2010 | Doi et al. |
| 7,792,987 | B1 | 9/2010 | Vohra et al. |
| 7,808,929 | B2 | 10/2010 | Wong et al. |
| 7,818,452 | B2 | 10/2010 | Matthews et al. |
| 7,826,482 | B1 | 11/2010 | Minei et al. |
| 7,839,847 | B2 | 11/2010 | Nadeau et al. |
| 7,856,549 | B2 | 12/2010 | Wheeler |
| 7,885,276 | B1 | 2/2011 | Lin |
| 7,925,850 | B1 | 4/2011 | Waldspurger et al. |
| 7,936,770 | B1 | 5/2011 | Frattura et al. |
| 7,937,438 | B1 | 5/2011 | Miller et al. |
| 7,948,986 | B1 | 5/2011 | Ghosh et al. |
| 7,953,865 | B1 | 5/2011 | Miller et al. |
| 7,991,859 | B1 | 8/2011 | Miller et al. |
| 7,995,483 | B1 | 8/2011 | Bayar et al. |
| 8,018,866 | B1* | 9/2011 | Kasturi et al. ................ 370/252 |
| 8,027,354 | B1 | 9/2011 | Portolani et al. |
| 8,031,633 | B2 | 10/2011 | Bueno et al. |
| 8,046,456 | B1 | 10/2011 | Miller et al. |
| 8,054,832 | B1 | 11/2011 | Shukla et al. |
| 8,055,789 | B2 | 11/2011 | Richardson et al. |
| 8,060,875 | B1 | 11/2011 | Lambeth |
| 8,064,362 | B2* | 11/2011 | Mekkattuparamban et al. ............... 370/254 |
| 8,131,852 | B1 | 3/2012 | Miller et al. |
| 8,149,737 | B2 | 4/2012 | Metke et al. |
| 8,166,201 | B2 | 4/2012 | Richardson et al. |
| 8,199,750 | B1 | 6/2012 | Schultz et al. |
| 8,204,982 | B2 | 6/2012 | Casado et al. |
| 8,224,931 | B1 | 7/2012 | Brandwine et al. |
| 8,224,971 | B1 | 7/2012 | Miller et al. |
| 8,265,075 | B2 | 9/2012 | Pandey |
| 8,312,129 | B1 | 11/2012 | Miller et al. |
| 8,339,959 | B1 | 12/2012 | Moisand et al. |
| 8,339,994 | B2 | 12/2012 | Gnanasekaran et al. |
| 8,456,984 | B2 | 6/2013 | Ranganathan et al. |
| 8,463,904 | B2 | 6/2013 | Casado et al. |
| 8,468,548 | B2 | 6/2013 | Kulkarni et al. |
| 8,516,158 | B1* | 8/2013 | Wu et al. ................ 709/247 |
| 8,571,031 | B2 | 10/2013 | Davies et al. |
| 8,611,351 | B2 | 12/2013 | Gooch et al. |
| 8,612,627 | B1 | 12/2013 | Brandwine et al. |
| 8,621,058 | B2 | 12/2013 | Eswaran et al. |
| 8,625,594 | B2 | 1/2014 | Safrai et al. |
| 8,644,188 | B1 | 2/2014 | Brandwine et al. |
| 8,650,618 | B2 | 2/2014 | Asati et al. |
| 8,743,885 | B2 | 6/2014 | Khan et al. |
| 8,762,501 | B2 | 6/2014 | Kempf et al. |
| 8,913,661 | B2 | 12/2014 | Zhang et al. |
| 8,966,024 | B2 | 2/2015 | Koponen et al. |
| 8,966,029 | B2 | 2/2015 | Zhang et al. |
| 2002/0093952 | A1 | 7/2002 | Gonda |
| 2002/0161867 | A1 | 10/2002 | Cochran et al. |
| 2002/0194369 | A1 | 12/2002 | Rawlins et al. |
| 2003/0069972 | A1 | 4/2003 | Yoshimura et al. |
| 2003/0093481 | A1 | 5/2003 | Mitchell et al. |
| 2004/0049701 | A1 | 3/2004 | Le Pennec et al. |
| 2004/0054793 | A1 | 3/2004 | Coleman |
| 2004/0098505 | A1 | 5/2004 | Clemmensen |
| 2005/0018669 | A1 | 1/2005 | Arndt et al. |
| 2005/0021683 | A1 | 1/2005 | Newton et al. |
| 2005/0050377 | A1 | 3/2005 | Chan et al. |
| 2005/0083953 | A1 | 4/2005 | May |
| 2005/0132030 | A1 | 6/2005 | Hopen et al. |
| 2005/0249199 | A1 | 11/2005 | Albert et al. |
| 2006/0092976 | A1 | 5/2006 | Lakshman et al. |
| 2006/0221961 | A1 | 10/2006 | Basso et al. |
| 2007/0140128 | A1 | 6/2007 | Klinker et al. |
| 2007/0233838 | A1 | 10/2007 | Takamoto et al. |
| 2007/0266433 | A1 | 11/2007 | Moore |
| 2007/0283348 | A1 | 12/2007 | White |
| 2007/0286185 | A1 | 12/2007 | Eriksson et al. |
| 2008/0002579 | A1 | 1/2008 | Lindholm et al. |
| 2008/0005293 | A1 | 1/2008 | Bhargava et al. |
| 2008/0049621 | A1 | 2/2008 | McGuire et al. |
| 2008/0071900 | A1 | 3/2008 | Hecker et al. |
| 2008/0072305 | A1 | 3/2008 | Casado et al. |
| 2008/0163207 | A1 | 7/2008 | Reumann et al. |
| 2008/0186990 | A1 | 8/2008 | Abali et al. |
| 2008/0189769 | A1 | 8/2008 | Casado et al. |
| 2008/0196100 | A1 | 8/2008 | Madhavan et al. |
| 2008/0225853 | A1 | 9/2008 | Melman et al. |
| 2008/0240122 | A1 | 10/2008 | Richardson et al. |
| 2008/0281908 | A1* | 11/2008 | McCanne et al. ............. 709/203 |
| 2009/0031041 | A1 | 1/2009 | Clemmensen |
| 2009/0063750 | A1 | 3/2009 | Dow |
| 2009/0083445 | A1 | 3/2009 | Ganga |
| 2009/0092137 | A1* | 4/2009 | Haigh et al. .................. 370/392 |
| 2009/0122710 | A1 | 5/2009 | Bar-Tor et al. |
| 2009/0129271 | A1 | 5/2009 | Ramankutty et al. |
| 2009/0150527 | A1 | 6/2009 | Tripathi et al. |
| 2009/0161547 | A1 | 6/2009 | Riddle et al. |
| 2009/0240924 | A1 | 9/2009 | Yasaki et al. |
| 2009/0249470 | A1 | 10/2009 | Litvin et al. |
| 2009/0249473 | A1 | 10/2009 | Cohn |
| 2009/0292858 | A1 | 11/2009 | Lambeth et al. |
| 2009/0300210 | A1 | 12/2009 | Ferris |
| 2009/0303880 | A1 | 12/2009 | Maltz et al. |
| 2010/0046530 | A1 | 2/2010 | Hautakorpi et al. |
| 2010/0046531 | A1 | 2/2010 | Louati et al. |
| 2010/0098092 | A1* | 4/2010 | Luo et al. ................ 370/401 |
| 2010/0115101 | A1 | 5/2010 | Lain et al. |
| 2010/0125667 | A1 | 5/2010 | Soundararajan |
| 2010/0128623 | A1* | 5/2010 | Dunn et al. ................ 370/252 |
| 2010/0131636 | A1 | 5/2010 | Suri et al. |
| 2010/0138830 | A1 | 6/2010 | Astete et al. |
| 2010/0153554 | A1 | 6/2010 | Anschutz et al. |
| 2010/0165877 | A1 | 7/2010 | Shukla et al. |

(56) References Cited

U.S. PATENT DOCUMENTS

| | | |
|---|---|---|
| 2010/0214949 A1 | 8/2010 | Smith et al. |
| 2010/0254385 A1 | 10/2010 | Sharma et al. |
| 2010/0257263 A1 | 10/2010 | Casado et al. |
| 2011/0002346 A1 | 1/2011 | Wu |
| 2011/0004698 A1 | 1/2011 | Wu |
| 2011/0004876 A1 | 1/2011 | Wu et al. |
| 2011/0004877 A1 | 1/2011 | Wu |
| 2011/0022695 A1 | 1/2011 | Dalal et al. |
| 2011/0075674 A1 | 3/2011 | Li et al. |
| 2011/0085559 A1 | 4/2011 | Chung et al. |
| 2011/0085563 A1* | 4/2011 | Kotha et al. ............ 370/401 |
| 2011/0225594 A1 | 9/2011 | Iyengar et al. |
| 2011/0261825 A1 | 10/2011 | Ichino |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0144014 A1 | 6/2012 | Natham et al. |
| 2012/0155266 A1 | 6/2012 | Patel et al. |
| 2012/0236734 A1 | 9/2012 | Sampath et al. |
| 2012/0246637 A1 | 9/2012 | Kreeger et al. |
| 2012/0281540 A1 | 11/2012 | Khan et al. |
| 2013/0019015 A1* | 1/2013 | Devarakonda et al. ...... 709/226 |
| 2013/0073743 A1* | 3/2013 | Ramasamy et al. .......... 709/238 |
| 2013/0125120 A1 | 5/2013 | Smith et al. |
| 2013/0125230 A1 | 5/2013 | Koponen et al. |
| 2013/0128891 A1 | 5/2013 | Koponen et al. |
| 2013/0132531 A1 | 5/2013 | Koponen et al. |
| 2013/0132532 A1 | 5/2013 | Zhang et al. |
| 2013/0132533 A1 | 5/2013 | Padmanabhan et al. |
| 2013/0132536 A1 | 5/2013 | Zhang et al. |
| 2013/0163427 A1 | 6/2013 | Beliveau et al. |
| 2013/0163475 A1 | 6/2013 | Beliveau et al. |
| 2013/0163594 A1 | 6/2013 | Sharma et al. |
| 2014/0016501 A1 | 1/2014 | Kamath et al. |
| 2014/0169375 A1 | 6/2014 | Khan et al. |
| 2014/0195666 A1 | 7/2014 | Dumitriu et al. |
| 2015/0081861 A1 | 3/2015 | Koponen et al. |

FOREIGN PATENT DOCUMENTS

| | | |
|---|---|---|
| EP | 1653688 | 5/2006 |
| EP | 2748713 | 7/2014 |
| EP | 2748714 | 7/2014 |
| EP | 2748716 | 7/2014 |
| EP | 2748717 | 7/2014 |
| EP | 2748750 | 7/2014 |
| EP | 2748978 | 7/2014 |
| JP | 2003-124976 | 4/2003 |
| JP | 2003-318949 | 11/2003 |
| WO | WO 99/18534 | 4/1999 |
| WO | WO 2005/112390 | 11/2005 |
| WO | WO 2008/095010 | 8/2008 |

OTHER PUBLICATIONS

WO 2013/074855 with International Search Report, May 23, 2013, Nicira, Inc.
WO 2013/074827 with International Search Report, May 23, 2013, Nicira, Inc.
WO 2013/074844 with International Search Report, May 23, 2013, Nicira, Inc.
WO 2013/074828 with International Search Report, May 23, 2013, Nicira, Inc.
WO 2013/074842 with International Search Report, May 23, 2013, Nicira, Inc.
Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown , "VMare for Linux Networking Support," Date Unknown but prior to Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of USENIX Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 15, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SiIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.

(56) References Cited

OTHER PUBLICATIONS

Keller, Eric, et al., "The 'Platform as a Service' Model for Networking," Month Unknown, 2010, pp. 1-6.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," In USENIX OSDI, Month Unknown, 2010, pp. 1-14.
Yang, L., et al., "Forwarding and Control Element Separation (ForCES) Framework," Apr. 2004, pp. 1-40, The Internet Society.
Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Portions of prosecution history of U.S. Appl. No. 13/678,498, filed Jun. 25, 2014, Nicira, Inc.
Portions of prosecution history of U.S. Appl. No. 13/678,485, filed Jun. 26, 2014, Nicira, Inc.
Portions of prosecution history of U.S. Appl. No. 13/678,518, filed Aug. 18, 2014, Nicira, Inc.
Portions of prosecution history of U.S. Appl. No. 13/678,504, filed Jul. 9, 2014, Nicira, Inc.
International Preliminary Report on Patentability for PCT/US2012/065359, May 30, 2014, Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.
U.S. Appl. No. 14/549,512, filed Nov. 20, 2014, Koponen, Teemu, et al.
U.S. Appl. No. 14/595,195, filed Jan. 12, 2015, Zhang, Ronghua et al.
U.S. Appl. No. 14/595,199, filed Jan. 12, 2015, Koponen, Teemu, et al.
Updated portions of prosecution history of U.S. Appl. No. 13/678,518, Sep. 2, 2014, Koponrn, Teemu, et al.
Updated portions of prosecution history of U.S. Appl. No. 13/678,504, Dec. 19, 2014, Koponen, Teemu, et al.
Updated portions of prosecution history of U.S. Appl. No. 13/678,498, Jan. 23, 2015, Koponen, Teemu, et al.
Portions of prosecution history of U.S. Appl. No. 13/678,536, Mar. 18, 2015, Padmanabhan, Amar, et al.
Updated portions of prosecution history of 13/678,485, Jan. 23, 2015, Zhang, Ronghua, et al.
Portions of prosecution history of U.S. Appl. No. 13/678,520, Feb. 11, 2015, Zhang, Ronghua, et al. .).
Portions of prosecution history of EP12849710.4, Jan. 12, 2015 (mailing date), Nicira, Inc.
Portions of prosecution history of EP12849295.6, Mar. 24, 2015 (mailing date), Nicira, Inc.
Portions of prosecution history of EP12849104.0, Jan. 30, 2015 (mailing date), Nicira, Inc.
Portions of prosecution history of AU2012340383, Mar. 19, 2015 (mailing date), Nicira, Inc.
Portions of prosecution history of EP12850519.5, Jan. 12, 2015 (mailing date), Nicira, Inc.
Portions of prosecution history of AU2012340387, Mar. 17, 2015 (mailing date), Nicira, Inc.
Portions of prosecution history of EP12849015.8, Jan. 29, 2015 (mailing date), Nicira, Inc.
Portions of prosecution history of EP12850665.6, Oct. 9, 2014 (mailing date), Nicira, Inc.
Author Unknown, "Enabling Service Chaining on Cisco Nexus 1000V Series," Month Unknown, 2012, 25 pages, Cisco.
Dumitriu, Dan Mihai, et al. (U.S. Appl. No. 61/514,990), filed Aug. 4, 2011.
Kent, S., "IP Encapsulating Security Payload (ESP)," Dec. 2005, pp. 1-44, The Internet Society.
Stiemerling, M., et al., "Middlebox Communication (MIDCOM) Protocol Semandtics," Mar. 2008, 70 pages, Internet Engineering Task Force.

* cited by examiner

WAN OPTIMIZER FOR LOGICAL NETWORKS

CLAIM OF BENEFIT TO PRIOR APPLICATION

This application claims the benefit of U.S. Provisional Application 61/560,279, entitled "Virtual Middlebox Services", filed Nov. 15, 2011. U.S. Application 61/560,279 is incorporated herein by reference.

BACKGROUND

Many current enterprises have large and sophisticated networks comprising switches, hubs, routers, middleboxes (e.g., wide area network (WAN) optimizers), servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments provide a non-transitory machine readable medium of a controller of a network control system for configuring a wide area network (WAN) optimizer instance to implement a WAN optimizer for a logical network. The controller receives a configuration for the WAN optimizer to optimize network data from the logical network for transmission to another WAN optimizer. The controller identifies several other controllers in the network control system on which to implement the logical network. The controller distributes the configuration for implementation on the WAN optimizer.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a non-transitory machine readable medium of a controller of a network control system for configuring a wide area network (WAN) optimizer instance to implement a WAN optimizer for a logical network. The controller receives a configuration for the WAN optimizer to optimize network data from the logical network for transmission to another WAN optimizer. The controller identifies several other controllers in the network control system on which to implement the logical network. The controller distributes the configuration for implementation on the WAN optimizer.

Several more detailed embodiments of the invention are described in the sections below. Section I conceptually describes details of several types of WAN optimizer deployments in a logical network according to some embodiments of the invention. Next, Section II conceptually describes details of the managed network architecture that is used to implement a logical network according to some embodiments of the invention. Section III follows this with a description of a configuration data flow for the managed network architecture of some embodiments. Next, Section IV describes several logical processing examples according to some embodiments of the invention. Finally, Section V describes an electronic system that implements some embodiments of the invention.

I. Exemplary Deployments of WAN Optimizers

Figure 1:
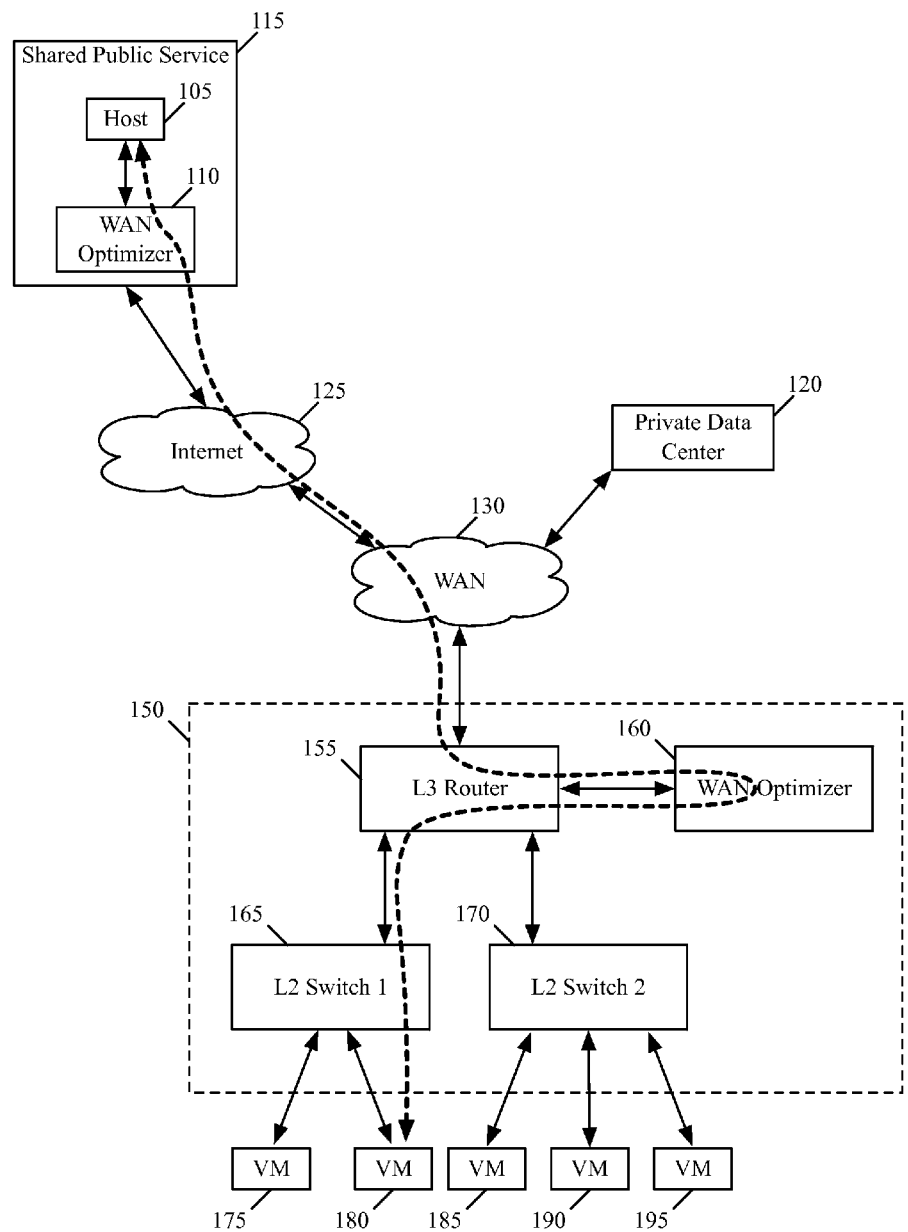
FIG. 1 conceptually illustrates an example deployment of a WAN optimizer in a logical network according to some embodiments of the invention.

FIG. 1 conceptually illustrates an example deployment of a WAN optimizer 160 in a logical network 150 according to some embodiments of the invention. Specifically, FIG. 1 illustrates the logical topology of the logical network 150 in which the WAN optimizer 160 is deployed. In some embodiments, a user specifies the logical network 150 by providing input (e.g., through a network controller) that describes a logical datapath set (LDPS), which is implemented by a set of network infrastructure switching elements (not shown in FIG. 1).

In some embodiments, a logical data path set defines a logical network element. A logical data path set, in some embodiments, is a set of network data paths through the set of network infrastructure switching elements that implement the logical network element and the logical network element's defined functionalities. As such, the logical network 150 in this example is a conceptual representation of the LDPS specified by the user.

As shown, the logical network 150 includes a logical layer 3 (L3) router 155, the WAN optimizer 160, logical layer 2 (L2) switches 165 and 170, and VMs 175-195. The L3 router 155 handles layer 3 routing of network data (e.g., packets) between the L2 switches 165 and 170, the WAN optimizer 160, and a WAN 130. The L2 switch 165 forwards network data between the L3 router 155 and the VMs 175 and 180 while the L2 switch 170 forwards network data between the L3 router 155 and the VMs 185-195.

The VMs 175-195 of some embodiments are host machines implemented as virtual machines running on separate and/or shared physical machines. The VMs 175-195 of some embodiments are each assigned a set of network layer host addresses (e.g., a MAC address for network layer 2, an IP address for network layer 3, etc.) and can send and receive network data to and from other network elements over the network.

In some embodiments, the WAN optimizer 160 is a middlebox device for increasing the efficiency of data transfers across the WAN 130 (e.g., accelerating the flow of data across the WAN 130). In some embodiments, the WAN optimizer 160 is implemented as a physical device, a set of physical devices (e.g., a cluster of physical devices), a virtual machine, a software application or module running on a computing device or a virtual machine, etc. The WAN optimizer 160 of different embodiments use any number of different WAN optimization techniques to increase the efficiency of data-transfers across the WAN 130. Examples of WAN optimization techniques include data deduplication, data compression, latency optimization, caching and/or proxying, forward error correction, protocol spoofing, traffic shaping, equalizing, connection limiting, simple rate limiting, etc.

As shown in FIG. 1, the WAN optimizer 160 is arranged as bounded or isolated by the L3 router 155 in the logical topology of the logical network 150. That is, network data must go through the L3 router 155 in order to reach the WAN optimizer 160. As such, network data from within the logical network that is specified (1) to be sent over the WAN 130 and (2) to be processed by the WAN optimizer 160 is sent to the WAN optimizer 160 through the L3 router 155. After the WAN optimizer 160 processes such network data, the data is sent back through the L3 router 155 before it is sent over the WAN 130.

In some embodiments, the WAN optimizer 160 generates a copy of the processed network data and sends the copy of the processed network data back to the L3 router 155 for the L3 router 155 to send over the WAN 130. In other words, the L3 router 155 receives back from the WAN optimizer 160 new network data (new packets) that is generated by the WAN optimizer 160. In some embodiments, the arrangement of the WAN optimizer 160 is referred to as a one-armed out-of-path deployment or a one-arm deployment.

In addition to the logical network 150, FIG. 1 illustrates a shared public service 115 that includes a host 105 and a WAN optimizer 110, a private data center 120, Internet 125, and the WAN 130. In some embodiments, the WAN 130 is a network that spans a large area (e.g., a city, a county, a region, a state, a country, etc.). The WAN 130 of some embodiments is used to connect networks (e.g., local area networks (LANs), campus area networks (CANs), metropolitan area networks (MANs), etc.), public and/or private, together to allow communication between the networks. As shown, the WAN 130 facilitates communication between the logical network 150, the private data center 120, and the shared public service 115 (through the Internet 125).

In some embodiments, the Internet 125 is a large public network of networks that connects computing devices around the world. The transmission control protocol (TCP)/Internet protocol (IP) is used as a communication protocol through the Internet 125 in some embodiments. As illustrated in FIG. 1, the Internet 125 provides communication between the shared public service 115 and the WAN 130.

In some embodiments, the private data center 120 is a dedicated space that contains anywhere from several computing devices to hundreds of computing devices (not shown in FIG. 1). Some or all of the computing devices are used to provide any number of different services and/or functions, such as email, proxy and domain name system (DNS) servers, web hosting, application servers, file servers, data backup, etc. In some embodiments, some or all of the computing devices are used for hosting virtual machines that in turn are used to provide any number of the aforementioned services and/or functions.

The shared public service 115 of some embodiments is a service available to the public that is accessible through the Internet 125. Examples of a shared public service include workloads hosted in public clouds (e.g., infrastructure as a service), software as a service, platform as a service, other cloud computing services, etc. In some embodiments, the host 105 is a machine (e.g., a computing device, a virtual machine, etc.) that provides a service for the shared public service 115.

In some embodiments, the WAN optimizer 110 is similar to the WAN optimizer 160. In other words, the WAN optimizer 110 of some such embodiments is a middlebox device for increasing the efficiency of data transfers across the WAN 130 (between the VM 180 and the host 105 in this example). In some embodiments, the WAN optimizer 110 is implemented as a physical device, a set of physical devices (e.g., a cluster of physical devices), a virtual machine, a software application or module running on a computing device or a virtual machine, etc. In different embodiments, the WAN optimizer 110 use any number of the different WAN optimization techniques mentioned above (e.g., data deduplication, data compression, latency optimization, caching and/or proxying, forward error correction, protocol spoofing, traffic shaping, equalizing, connection limiting, simple rate limiting, etc.) to increase the efficiency of data-transfers across the WAN 130.

In this example, network data communicated between VM 180 in the logical network 150 and the host 105 in the shared public service 115 is optimized by the WAN optimizer 160 and the WAN optimizer 110. In some embodiments, the WAN optimizer 160 is referred to as a local endpoint and the WAN optimizer 110 is referred to as a remote endpoint. As shown in FIG. 1, a dotted line represents the path of the optimized network data. Specifically, the L2 switch 165 forwards the network data received from the VM 180 to the L3 router 155. When the L3 router 155 receives the network data, the L3 router 155 routes it to the WAN optimizer 160 for processing. After the WAN optimizer 160 processes the network data (e.g., compresses the network data) and returns the optimized data to the L3 router 155, the L3 router 155 routes the network data over the WAN 130 and the Internet 125 to the shared public service 115. When the shared public service 115 receives the optimized data, the WAN optimizer 110 processes the network data (e.g., decompresses the network data) and sends the data to the host 105.

Figure 2:
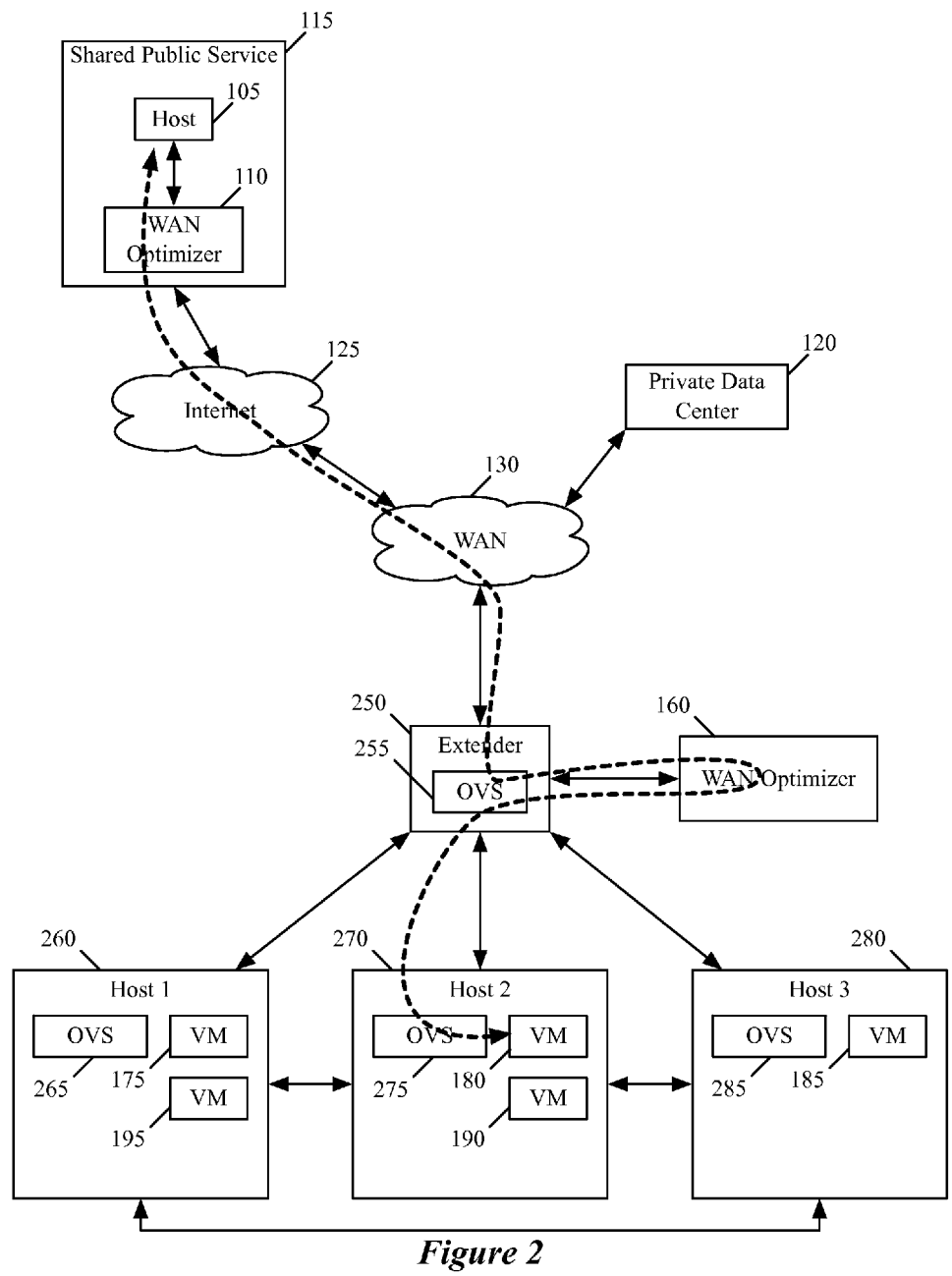
FIG. 2 conceptually illustrates a physical network architecture that implements the logical network illustrated in FIG. 1 according to some embodiments of the invention.

FIG. 2 conceptually illustrates a physical network architecture that implements the logical network illustrated in FIG. 1 according to some embodiments of the invention. FIG. 2 is similar to FIG. 1 except FIG. 2 illustrates a physical network architecture that includes an extender 250 switching element, and hosts 260-280.

In some embodiments, the extender 250 enables communication between hosts in a managed network and hosts in unmanaged networks. For this example, the extender 250 facilitates communication between the VMs 175-195, which are part of a managed network, and the host 105, which is part of an unmanaged network. In some embodiments, the extender is implemented as a physical machine (e.g., a computing device, such as computer system) while, in other embodiments, the extender 250 is implemented as a virtual machine (not shown in FIG. 2) running on a physical machine. As shown, the extender 250 includes a software switching element referred to as an Open Virtual Switch (OVS) for forwarding and routing network data between network elements coupled to the OVS 255 (the WAN optimizer 160 and the OVSs 265-285 in this example). In some embodiments, the OVS 255 and the WAN optimizer 160 communicate with each other through a tunnel (e.g., a generic routing encapsulation (GRE) tunnel, a Control And Provisioning of Wireless Access Points (CAPWAP) tunnel, a web cache communication protocol (WCCP) tunnel, etc.).

The hosts 260-280 are physical machines (e.g., computing devices, such as computer system) in some embodiments. As shown, the hosts 260-280 each includes an OVS software switching element for forwarding and routing network data between network elements coupled to the OVSs 265-285 (the VMs 175-195 and the extender 250 in this example). In some embodiments, the OVSs 255-285 operate in a virtual machine running on the hosts 260-280.

The OVSs 265-285 of some embodiments are referred to as edge switching elements because they are managed switching elements at the edge of the network infrastructure. That is, the OVSs 265-285 are directly connected to network hosts (the VMs 175-195 in this example). In contrast, a non-edge switching element (the pool node 250 in this example) is a switching element that interconnects the edge switching elements. In some embodiments, non-edge switching elements are referred to as interior switching elements. Additionally, in some embodiments, the OVSs 255-285 are referred to as managed switching elements as they are managed by a network control system in some embodiments (as opposed to unmanaged switches, which are not managed by the network control system, in the network) in order to implement the logical network 150. Each of the OVSs 255-285 communicates with each of the other OVSs through tunnels (e.g., a GRE tunnel, a CAPWAP tunnel, a WCCP tunnel, etc.) in some embodiments.

As described above by reference to FIG. 1, a user in some embodiments specifies the logical network 150 by providing input that describes an LDPS, which is conceptually represented by the logical network 150 and is implemented by a set of managed switching elements. For this example, the OVSs 255-285 are used to implement the LDPS. As explained below, to configure the set of managed switching elements, the network control system of some embodiments receives input from the user and converts the user-provided data into logical control plane (LCP) data, and then converts the LCP data into logical forward plane (LFP) data, which the network control system in turn converts into physical control plane (PCP) data. The network control system sends the PCP data to the set of managed switching elements (the OVSs 255-285 in this example) to convert to physical forwarding plane (PFP) data in order to implement the LDPS described by the user-provided LCP data.

In some embodiments, the network control system converts the LFP data to universal PCP (UPCP). UPCP data in some embodiments is a data plane that enables the control system of some embodiments to scale even when it contains a large number of managed switching elements (e.g., thousands) to implement a LDPS. The UPCP abstracts common characteristics of different managed switching elements in order to express PCP data without considering differences in the managed switching elements and/or location specifics of the managed switching elements.

In some embodiments, network control system translates the UPCP data into customized PCP (CPCP) data for each managed switching element in order to completely implement LDPSs at the managed switching elements. In some such embodiments, the network control system (1) generates CPCP data for each managed switching element by expanding the UPCP data to characteristics specific and/or local to the managed switching element (e.g., ports on the managed switching element) and (2) sends the CPCP data to the managed switching element.

Instead of generating CPCP for each of the managed switching elements, the network control system of some embodiments sends the UPCP data to each of the managed switching elements for the managed switching elements to each generate its own CPCP data, which is used to generate PFP data for the managed switching element. To communicate with and configure the managed switching elements, the network control system of some embodiments uses the OpenFlow or OVS application programming interfaces (APIs) provided by the managed switching elements.

To configure the WAN optimizer 160, the network control system of some embodiments pushes the user-provided WAN optimizer configuration data to the WAN optimizer 160 through a set of APIs provided by the WAN optimizer 160. In some embodiments, the WAN optimizer configuration data includes (1) local endpoint information related to a local WAN optimizer, such as a name for the local endpoint, an IP address of the local WAN optimizer, and, in some cases, an external interface of the local WAN optimizer, and (2) remote endpoint information related to a remote WAN optimizer, such as a name for the remote endpoint, an IP address of the remote WAN optimizer, and a set of rules for filtering network data passing through the remote WAN optimizer. The set of rules in some embodiments includes a combination of any number of a source IP subnet, a destination IP subnet, and a list of ports or port ranges and a name of an optimization profile, which is described below.

The WAN optimizer configuration data includes information for a deduplication feature provided by a WAN optimizer of some embodiments. Such information includes in some embodiments a deduplication flag for enabling and disabling the deduplication feature, a cache size for the deduplication feature, and a dedpulication mode that specifies a storage medium (e.g., memory, disk, hybrid memory and disk, etc.) to which the deduplication feature is applied.

An optimization profile specifies the manner in which network data passing through a WAN optimizer is optimized. In some embodiments, information for an optimization profile includes a name of the optimization profile, information for an application profile, a deduplication flag for enabling and disabling a deduplication feature, a compression flag for enabling and disabling a compression feature, and a transparency flag for enabling and disabling an IP transparency feature. In some embodiments, the application profile information may include an application protocol, a set of destination ports of the application protocol, and a key-value pair specific to the application protocol. The WAN optimizer of some such embodiments optimizes network data using the application protocol specified in the application profile.

Different embodiments use any number of additional and different WAN optimizer configuration to configure a WAN optimizer. For instance, in some embodiments the WAN optimizer configuration data includes an enable flag for enabling and disabling a WAN optimizer, a logging setting for specifying a setting of the standard logging feature.

In some embodiments, the network control system also pushes attachment data along with the WAN optimizer configuration data to the WAN optimizer 160 through the set of APIs. In some embodiments, the attachment data for the WAN optimizer 160 includes a tunnel type (e.g., a GRE tunnel, a CAPWAP tunnel, a WCCP tunnel, etc.) for the WAN optimizer 160 to use for sending and receiving network data to and from each of the OVSs 265-285. The tunnel type is specified by the user as part of the WAN optimizer configuration data in some embodiments while the network control system automatically determines the tunnel type in other embodiments.

In some embodiments, the network control system generates slicing data for the WAN optimizer 160 and pushes this data along with the WAN optimizer configuration data to the WAN optimizer 160 through the set of APIs. The slicing data of some embodiments includes a unique identifier associated with a middlebox in a logical network (e.g., the WAN optimizer 160 in the logical network 150 described above by reference to FIG. 1). In some embodiments, the WAN optimizer 160 uses the unique identifiers of slicing data to implement (1) different WAN optimizers for a particular logical network and/or (2) different WAN optimizers for multiple different logical networks.

As illustrated in FIG. 2, the WAN optimizer 160 is arranged as bounded or isolated by the extender 250 in the physical network architecture. That is, network data must go through the extender 250 in order to reach the WAN optimizer 160. Accordingly, network data from the VMs 175-195 that is specified (1) to be sent over that WAN 130 and (2) to be processed by the WAN optimizer 160 is sent through the extender 250 to the WAN optimizer 160 for processing and then back through the extender 250 for the extender 250 to sent over the WAN 130.

For this example, network data communicated between VM 180 in the physical network architecture and the host 105 in the shared public service 115 is optimized by the WAN optimizer 160 and the WAN optimizer 110. The path of the optimized network data is illustrated in FIG. 2 by a dotted line. In particular, the OVS 275 forwards the network data received from the VM 180 to the extender 250, which routes the network data to the WAN optimizer 160 for processing. After the WAN optimizer 160 processes the network data (e.g., compresses the network data) and returns the optimized data to the extender 250, the extender 250 routes it over the WAN 130 and the Internet 125 to the shared public service 115. When the shared public service 115 receives the optimized data, the WAN optimizer 110 processes the network data (e.g., decompresses the network data) and sends the data to the host 105.

As described above by reference to FIGS. 1 and 2, some embodiments utilize a one-arm deployment of a WAN optimizer in a logical network. Alternatively or in conjunction with the one-arm deployment, some embodiments deploy a WAN optimizer differently.

Figure 3:
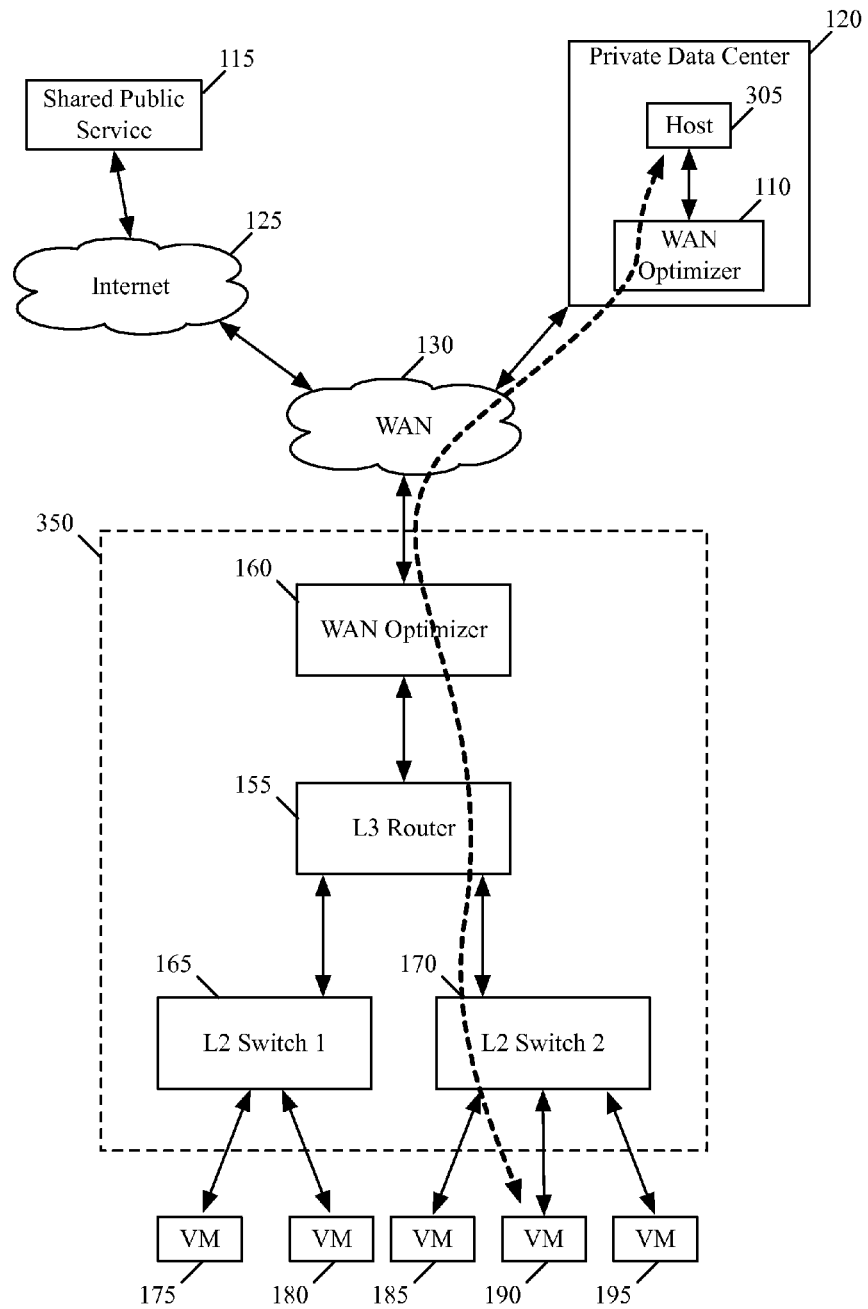
FIG. 3 conceptually illustrates another example deployment of a WAN optimizer in a logical network according to some embodiments of the invention.

FIG. 3 conceptually illustrates another example deployment of a WAN optimizer in a logical network 350 according to some embodiments of the invention. Specifically, FIG. 3 illustrates the logical topology of the logical network 350 in which the WAN optimizer 160 is deployed. In some embodiments, a user specifies the logical network 350 by providing input (e.g., through a network controller) that describes an LDPS, which is implemented by a set of network infrastructure switching elements (not shown in FIG. 3). As noted above, a logical data path set in some embodiments defines a logical network element, and, in some embodiments, is a set of network data paths through the set of network infrastructure switching elements that implement the logical network element and the logical network element's defined functionalities. Thus, the logical network 350 in this example is a conceptual representation of the LDPS specified by the user.

As illustrated in FIG. 3, the logical network 350 includes the L3 router 155, the WAN optimizer 160, the L2 switches 165 and 170, and the VMs 175-195. In this example, the WAN optimizer 160 is arranged between the L3 router 155 and the WAN 130 in the logical topology of the logical network 350. Under this type of deployment of the WAN optimizer 160, network data that is specified to be sent over the WAN 130 must pass through the WAN optimizer 160 regardless of whether the network data is specified to be processed by the WAN optimizer 160. In some embodiments, the arrangement of the WAN optimizer 160 shown in FIG. 3 is referred to as a physical-in-band deployment or an in-line deployment.

In addition, FIG. 3 illustrates the shared public service 115, the private data center 120 that includes a host 305 and the WAN optimizer 110, the Internet 125, and the WAN 130. As shown, the host 305 is a machine (e.g., a computing device, a virtual machine, etc.) within the private data center 120. The WAN optimizer 110 in this example is increasing the efficiency of data transfers across the WAN 130 between the VM 190 and the host 305. That is, network data communicated between VM 190 in the logical network 350 and the host 305 in the private data center 120 is optimized by the WAN optimizer 160 and the WAN optimizer 110.

As shown in FIG. 3, a dotted line represents the path of the optimized network data. Specifically, the L2 switch 170 forwards the network data received from the VM 190 to the L3 router 155. When the L3 router 155 receives the network data, the L3 router 155 routes it to the WAN optimizer 160 for processing. Once the WAN optimizer 160 processes the network data (e.g., compresses the network data), the WAN optimizer 160 sends the network data over the WAN 130 to the private data center 120. When the private data center 120 receives the optimized data, the WAN optimizer 110 processes the network data (e.g., decompresses the network data) and sends the data to the host 305.

Figure 4:
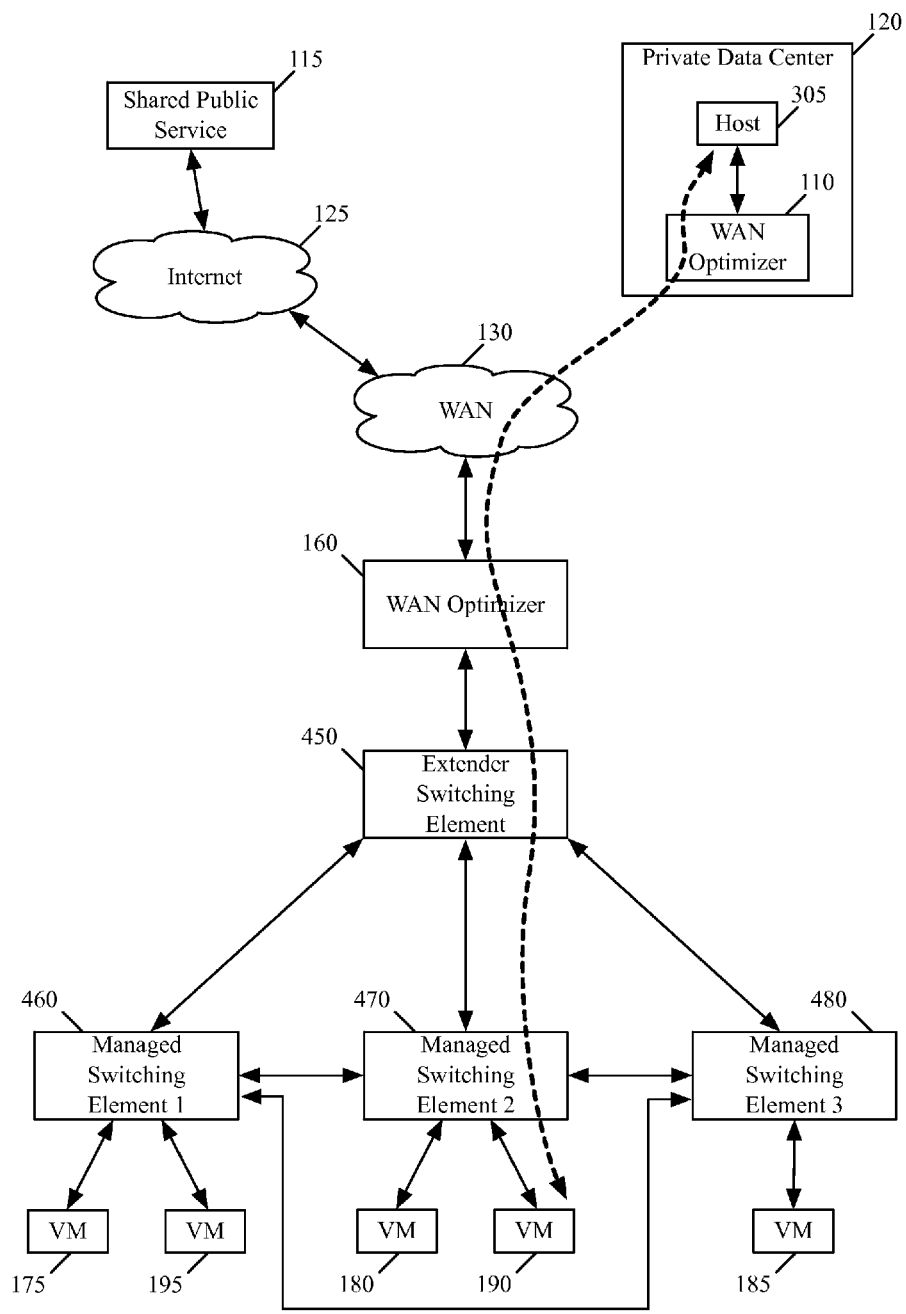
FIG. 4 conceptually illustrates a physical network architecture that implements the logical network illustrated in FIG. 3 according to some embodiments of the invention.

FIG. 4 conceptually illustrates a physical network architecture that implements the logical network illustrated in FIG. 3 according to some embodiments of the invention. FIG. 4 is similar to FIG. 3 except FIG. 4 illustrates a physical network architecture that includes an extender 450 switching element, and managed switching elements 460-480.

The extender 450 is similar to the extender 250 described above by reference to FIG. 2 to the extent that the extender 450 (1) enables communication between hosts in a managed network and hosts in unmanaged networks (the VMs 175-195, which are part of a managed network, and the host 305, which is part of an unmanaged network in this example) and (2) forwards and routes network data between network elements coupled to the extender 450 (the WAN optimizer 160 and the managed switching elements 460-480 in this example). In some embodiments, the extender 450 is implemented as a physical switching element, a virtual switching element, a software switching element (e.g., an OVS switching element), or any other type of network element that is capable of forwarding and routing network data. The extender 450 and the WAN optimizer 160 communicate with each other through a tunnel (e.g., a generic routing encapsulation (GRE) tunnel, a Control And Provisioning of Wireless Access Points (CAPWAP) tunnel, a web cache communication protocol (WCCP) tunnel, etc.) in some embodiments.

In some embodiments, the managed switching elements 460-480 are switching elements that forward and route network data between network elements coupled to the managed switching elements 460-480. Like the extender 450, each of the managed switching elements 460-480 is implemented as a physical switching element, a virtual switching element, a software switching element (e.g., an OVS switching element), or any other type of network element that is capable of forwarding and routing network data. In some embodiments, each of the managed switching elements 460-480 communicates with each of the other managed switching elements through tunnels (e.g., a GRE tunnel, a CAPWAP tunnel, a WCCP tunnel, etc.).

In some embodiments, the managed switching elements 460-480 are referred to as edge switching elements because they are managed switching elements at the edge of the network infrastructure. That is, the managed switching elements 460-480 are directly connected to network hosts (the VMs 175-195 in this example). On the other hand, a non-edge switching element (the extender 450 in this example), which is also referred to as an interior switching element, is a switching element that interconnects the edge switching elements.

As described above by reference to FIG. 3, a user in some embodiments specifies the logical network 350 by providing input that describes an LDPS, which is conceptually represented by the logical network 350 and is implemented by a set of managed switching elements. For this example, the managed switching elements 460-480 are used to implement the LDPS. As explained below, to configure the set of managed switching elements, the network control system of some embodiments converts the user-provided data into LCP data, and then converts the LCP data into LFP data, which the network control system in turn converts into PCP data. The network control system sends the PCP data to the managed switching elements to convert to PFP data in order to implement the LDPS described by the user-provided LCP data.

In some embodiments, the network control system converts the LFP data to UPCP data and generates CPCP data for each of the managed switching elements. As mentioned above, UPCP data in some embodiments is a data plane that enables the control system of some embodiments to scale even when it contains a large number of managed switching elements (e.g., thousands) to implement a LDPS. The UPCP abstracts common characteristics of different managed switching elements in order to express PCP data without considering differences in the managed switching elements and/or location specifics of the managed switching elements.

In some embodiments, network control system translates the UPCP data into customized PCP (CPCP) data for each managed switching element in order to completely implement LDPSs at the managed switching elements. In some such embodiments, the network control system (1) generates CPCP data for each managed switching element by expanding the UPCP data to characteristics specific and/or local to the managed switching element (e.g., ports on the managed switching element) and (2) sends the CPCP data to the managed switching element.

Instead of generating CPCP for each of the managed switching elements, the network control system of some embodiments sends the UPCP data to each of the managed switching elements for the managed switching elements to each generate its own CPCP data, which is used to generate PFP data for the managed switching element. To communicate with and configure the managed switching elements, the network control system of some embodiments uses the Open-Flow or OVS APIs provided by the managed switching elements.

To configure the WAN optimizer 160, the network control system of some embodiments pushes the user-provided WAN optimizer configuration data to the WAN optimizer 160 through a set of APIs provided by the WAN optimizer 160. In some embodiments, the network control system also pushes attachment data along with the WAN optimizer configuration data to the WAN optimizer 160 through the set of APIs. In some embodiments, the attachment data for the WAN optimizer 160 includes a tunnel type (e.g., a GRE tunnel, a CAPWAP tunnel, a WCCP tunnel, etc.) for the WAN optimizer 160 to use for sending to and receiving from network data to each of the managed switching elements 460-480. The tunnel type is specified by the user as part of the WAN optimizer configuration data in some embodiments while the network control system automatically determines the tunnel type in other embodiments.

In some embodiments, the network control system generates slicing data for the WAN optimizer 160 and pushes this data along with the WAN optimizer configuration data to the WAN optimizer 160 through the set of APIs. The slicing data of some embodiments includes a unique identifier associated with a middlebox in a logical network (e.g., the WAN optimizer 160 in the logical network 150 described above by reference to FIG. 1). In some embodiments, the WAN optimizer 160 uses the unique identifiers of slicing data to implement (1) different WAN optimizers for a particular logical network and/or (2) different WAN optimizers for multiple different logical networks.

FIG. 4 shows the WAN optimizer 160 arranged between the extender 450 and the WAN 130 in the physical network architecture. Therefore, network data that is specified to be sent over the WAN 130 must pass through the WAN optimizer 160 regardless of whether the network data is specified to be processed by the WAN optimizer 160.

In this example, network data communicated between VM 190 in the physical network architecture and the host 305 in the private data center 120 is optimized by the WAN optimizer 160 and the WAN optimizer 110. A dotted line shown in FIG. 4 represents the path of the optimized network data. Specifically, the managed switching element 470 forwards the network data received from the VM 190 to the extender 450, which routes the network data to the WAN optimizer 160 for processing. Once the WAN optimizer 160 processes the network data (e.g., compresses the network data), the WAN optimizer 160 sends it over the WAN 130 to the private data center 120. When the private data center 120 receives the optimized data, the WAN optimizer 110 processes the network data (e.g., decompresses the network data) and sends the data to the host 305.

While FIGS. 1-4 illustrate a particular arrangement of networks and network elements, one of ordinary skill in the art will realize that different arrangements are possible in different embodiments. For instance, in some embodiments, just a WAN (as opposed to a WAN and the Internet) may facilitate communication between the shared public service, the private data center, and the logical network.

II. Managed Network Architecture

Figure 5:
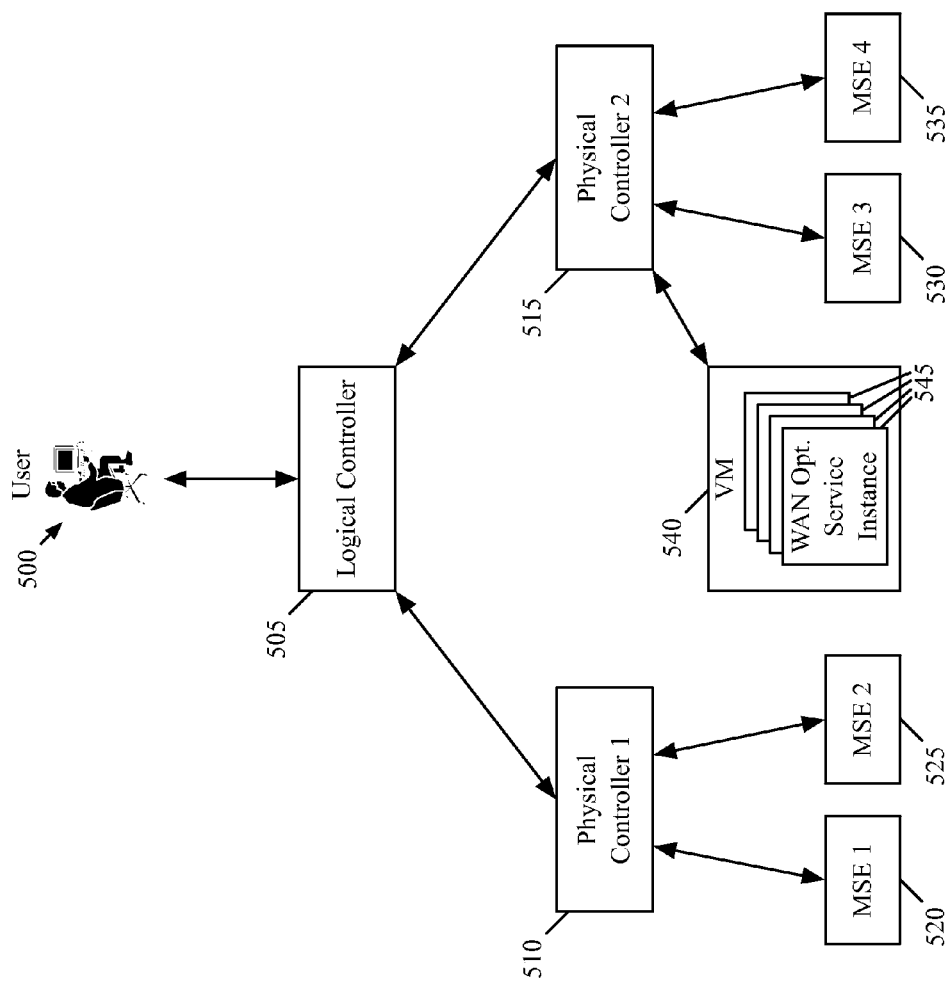
FIG. 5 conceptually illustrates a managed network architecture of some embodiments that is used to implement a logical network.

As described above, the network control system of some embodiments manages a set of switching elements in the physical network infrastructure in order to implement LDPSs (i.e., logical networks). FIG. 5 conceptually illustrates a managed network architecture of some embodiments that is used to implement a logical network (e.g., the logical networks 150 and 350 described above by reference to FIGS. 1 and 3, respectively). Specifically, FIG. 5 illustrates a user 500, a logical controller 505, physical controllers 510 and 515, managed switching elements 520-535, and a virtual machine (VM) 540 that implements a WAN optimizer of some embodiments.

In some embodiments, each of the controllers in a network control system has the capability to function as a logical controller and/or physical controller. Alternatively, in some embodiments a given controller may only have the functionality to operate as a particular one of the types of controller (e.g., as a physical controller). In addition, different combinations of controllers may run in the same physical machine. For instance, the logical controller 505 and the physical controller 510 may run in the same computing device, with which a user interacts.

The logical controller 505 in some embodiments is responsible for implementing LDPSs by computing UPCP data (e.g., universal flow entries that are generic expressions of flow entries) for the physical controllers 510 and 515 and the managed switching elements 520-535 to implement the LDPSs. For a particular LDPS, only one logical controller is responsible for implementing the particular LDPS (e.g., is a master of the particular LDPS) in some such embodiments. However, more than one logical controller can be masters of the same LDPS in some embodiments. In addition, a logical controller of some embodiments can be the master of more than one LDPS.

As noted above, in some embodiments, a user specifies a logical network by providing input that describes an LDPS. The input might be related to creating a logical network, modifying the logical network, and/or deleting the logical network in some embodiments. In this example, the logical controller 505 allows the user 500 to specify a logical network through the logical controller 505. When the user 500 specifies a WAN optimizer for the logical network, the user may also provide policy-based routing data that specifies the type of network data to be optimized by the WAN optimizer.

In some embodiments, the logical controller 505 includes an input module (not shown in FIG. 5), such as an input translation application, for translating the input provided by the user 500 into LCP data while, in other embodiments, the input module runs on a separate controller and the logical controller 505 receives the LCP data from the input module on the separate controller. The logical controller 505 of some embodiments provides the user input to the input module in the form of API calls. In some embodiments, the logical controller 505 also includes a control module (e.g., a control application) that generates LFP data from the LCP data output by the input module. The logical controller 505 of some embodiments further includes a virtualization module (e.g., a virtualization application) that generates UPCP from the LFP data output by the control module and sends the UPCP data to the physical controllers 510 and 515.

In some embodiments, a logical controller identifies a set of physical controllers that are masters of the managed switching elements that implement LDPSs. In this example, the managed switching elements 520-535 are responsible for implementing LDPSs and, thus, the logical controller 505 identifies the physical controllers 510 and 515 and sends each of the physical controllers 510 and 515 the generated UPCP data.

When the user specifies a WAN optimizer for the logical network, the logical controller 505 of some embodiments identifies WAN optimizer data for creating a WAN optimizer service instance 545 on the VM 540 and configuring the WAN optimizer service instance 545. In some embodiments, the logical controller 505 sends WAN optimizer data to the physical controllers 510 and 515 along with the generated UPCP data.

In some embodiments, only one physical controller manages a particular managed switching element. For this example, only the physical controller 510 manages the managed switching elements 520 and 525 and only the physical controller 515 manages the managed switching elements 530 and 535. The physical controllers 510 and 515 of some embodiments generate CPCP data (e.g., customized flow entries from universal flow entries) and push these CPCP data down to the managed switching elements 520-535 and the WAN optimizer(s) running on the VM 540. Alternatively, the physical controllers 510 and 515 of some embodiments push the UPCP data to the managed switching elements 520-535 and the managed switching elements 520-535 each generates CPCP data for its own respective managed switching element.

In some embodiments, the physical controllers 510 and 515 access the managed switching elements 520-535 by using the OpenFlow or OVS APIs provided by the switching elements. Additionally, the physical controllers 510 and 515 uses a set of APIs to create a WAN optimizer service instance 545 on the VM 540 and to send WAN optimizer data to the WAN optimizer service instance 545.

For a VM that implements WAN optimizer service instances, only one physical controller is responsible for managing the VM in some embodiments. As shown in FIG. 5, the physical controller 515 manages the VM 540. To configure a WAN optimizer service instance 545 on the VM 540, the physical controller 515 of some embodiments pushes user-provided WAN optimizer configuration data to the VM 540 through a set of APIs provided by the VM 540. In some embodiments, the physical controller 515 also pushes attachment data to the VM 540 through the set of APIs. The attachment data in some embodiments includes a tunnel type (e.g., a GRE tunnel, a CAPWAP tunnel, a WCCP tunnel, etc.) for the WAN optimizer service instance 540 to use for sending and receiving network data to and from each of the managed switching elements 520-535. In some embodiments, the tunnel type is specified by the user as part of the WAN optimizer configuration data while, in other embodiments, the physical controller 515 automatically determines the tunnel type.

In some embodiments, the physical controller 515 generates slicing data for the WAN optimizer service instance 545 and pushes this data along with the WAN optimizer configuration data to the VM 540 through the set of APIs. As mentioned above, the slicing data of some embodiments includes a unique identifier associated with a middlebox in a logical network (e.g., the WAN optimizer 160 in the logical network 150 described above by reference to FIG. 1).

As explained above, the managed switching elements of some embodiments handle the implementation of LDPSs. In some embodiments, the managed switching elements 520-535 implement LDPSs by generating PFP data based on the CPCF that the managed switching elements 520-535 receives from the physical controllers 510 and 515. Instead of receiving CPCP data, the managed switching elements 520-535 of some embodiments receives UPCP data from the physical controllers 510 and 515. In some such embodiments, each of the managed switching elements 520-535 generates CPCP data from the UPCP data and then generates the PFP data from the generated CPCP data.

In some embodiments, the VM 540 receives configuration data from the physical controller 515 and, in response, translates the configuration data into a form that is usable by the VM 540. For instance, in some embodiments, the WAN optimizer configuration data is in a particular language that expresses the packet processing, analysis, modification, etc. rules. The VM 540 of some such embodiments compiles these rules into more optimized packet classification rules. In some embodiments, this transformation is similar to the PCP data to PFP data translation. When the VM 540 receives a packet, the VM 540 applies the compiled optimized rules in order to efficiently and quickly perform its operations on the packet. In some embodiments, the VM 540 is a physical device, a set of physical devices (e.g., a cluster of physical devices), a software application or module running on a computing device or a virtual machine, etc.

The virtual machine 540 is responsible for creating and managing WAN optimizer service instances 545 in some embodiments. When the virtual machine 540 receives a request from one of the physical controllers 510 and 515 through an API to create a WAN optimizer service instance 545, the virtual machine 540 instantiates a WAN optimizer service instance 545 and configures it using the WAN optimizer data received from one of the physical controllers 510 and 515 to configure the WAN optimizer service instance 545. In some embodiments, the VM 540 sends to the logical controller 505 state information and/or statistical information regarding a particular WAN optimizer service instance 545 when the VM 540 receives requests for such information from the logical controller 505 through API calls.

In some embodiments, the logical controller 505, the physical controllers 510 and 515, and the managed switching elements 520-535 use a table mapping engine referred to as nLog that is based on a variation of the datalog database language in order to generate the different types of data (e.g., LCP data, LFP data, UPCP data, CPCP data, PFP data, WAN configuration data, etc.). For instance, the logical controller 505 inputs LCP data to an input table of the table mapping engine of some embodiments and the table mapping engine automatically generates LFP data, which the table mapping engine stores in one of its output tables. Details of the table mapping engine of some embodiments are described below by reference to FIG. 8.

In addition to processing input provided by the user 500, the managed network architecture illustrated in FIG. 5 processes non-user changes to LDPSs. The logical controller 505 computes UPCP data based on the changes and propagates the UPCP to the physical controllers 510 and 515 to in turn propagate to the managed switching elements 520-535 and the virtual machine 540 that implements the WAN optimizer(s).

Figure 6:
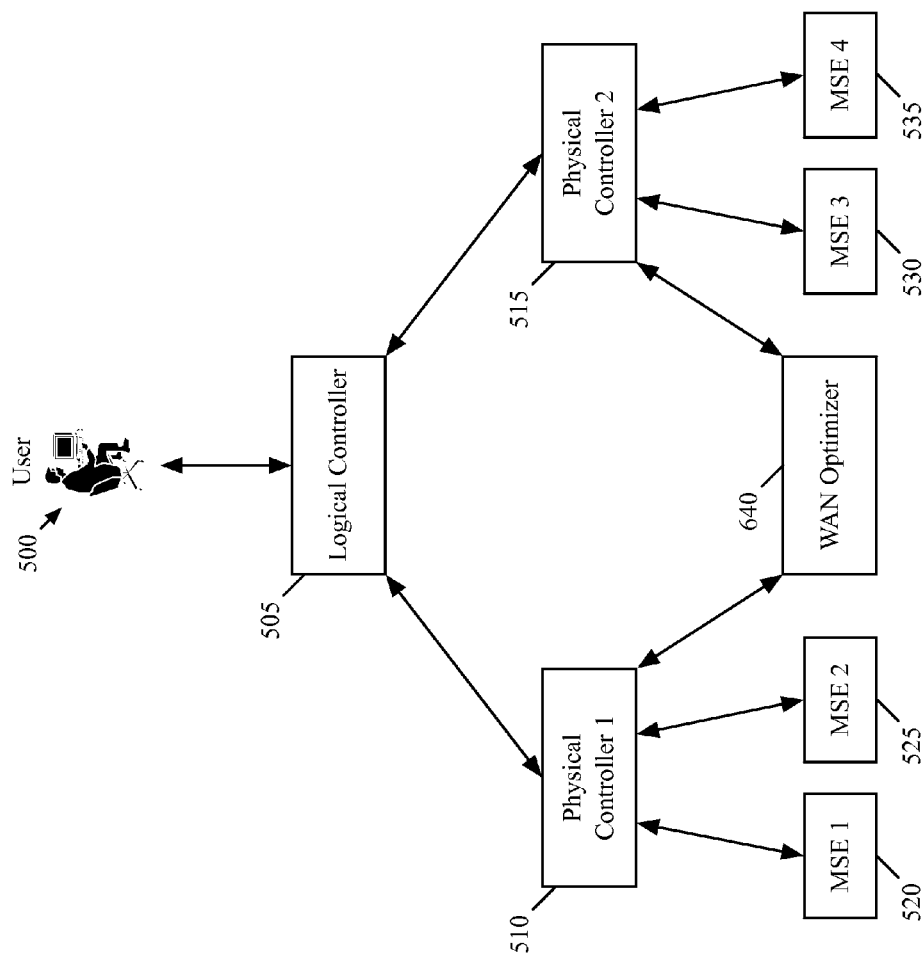
FIG. 6 conceptually illustrates a managed network architecture of some embodiments that is used to implement a logical network.

FIG. 6 conceptually illustrates a managed network architecture of some embodiments that is used to implement a logical network (e.g., the logical networks 150 and 350 described above by reference to FIGS. 1 and 3, respectively). The managed network architecture illustrated in FIG. 6 is similar to the managed network architecture described above by reference to FIG. 5 except the logical controller 505 and the physical controllers 510 and 515 communicate with a WAN optimizer 640 (as opposed to the VM 540). In some embodiments, the WAN optimizer 640 is a physical device, a set of physical devices (e.g., a cluster of physical devices), a software application or module running on a computing device or a virtual machine, or any other type of centralized form factor.

III. Configuration of WAN Optimizers and Switching Elements

Figure 7:
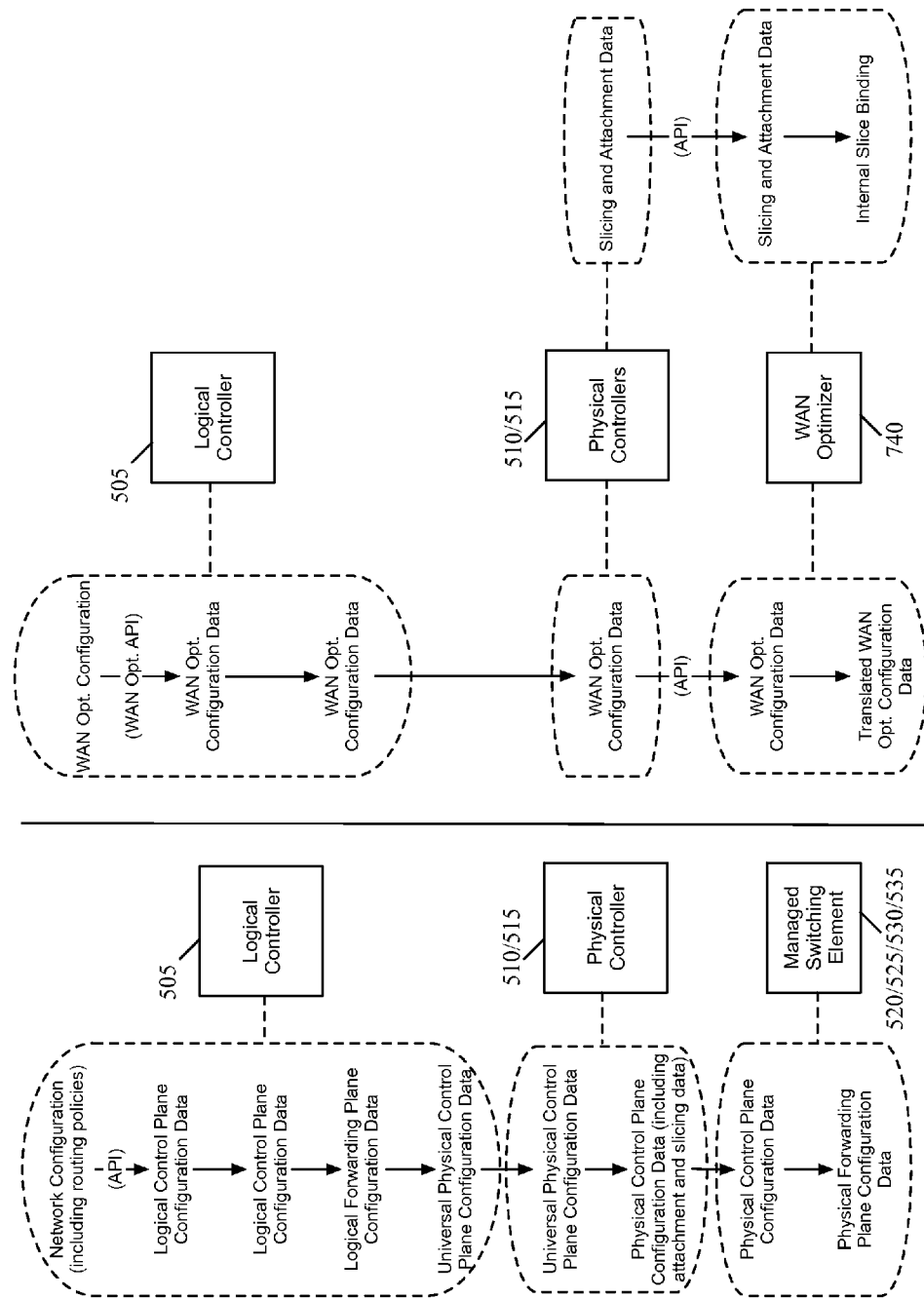
FIG. 7 conceptually illustrates an example flow of configuration data for the managed network architecture illustrated in FIGS. 5 and 6 according to some embodiments of the invention.

The previous Section II describes several examples of managed network architectures that are used to implement LDPSs according to some embodiments of the invention. FIG. 7 conceptually illustrates an example flow of configuration data for the managed network architecture illustrated in FIGS. 5 and 6 according to some embodiments of the invention. In particular, the left side of FIG. 7 illustrates the flow of configuration data for a LPDS and the right side of FIG. 7 illustrates the flow of configuration data for a WAN optimizer 740. The WAN optimizer 740 in some embodiments is a WAN optimizer service instance 545 or the WAN optimizer 640.

As shown on the left side of FIG. 7, the logical controller 505 receives network configuration data (from a user), which includes policy-based routing data, through a set of APIs provided by the logical controller 505. The network configuration data in this example describes an LDPS (i.e., a logical network). As noted above, in some embodiments, the logical controller 505 includes an input module (not shown in FIG. 7), such as an input translation application for generating LCP data from the network configuration data from a user specifying an LDPS while, in other embodiments, the input module runs on a separate controller and the logical controller 505 receives the LCP data from the input module on the separate controller.

The logical controller 505 generates the UPCP data from the LCP data by converting the LCP data to LFP data and then converting the LFP data to UPCP. In some embodiments, the logical controller 505 includes a control module (not shown in FIG. 7) that is responsible for generating the LFP data from the LCP data and a virtualization module (not shown in FIG. 7) that handles the generation of the UPCP data from the LFP data. Once the logical controller 505 generates the UPCP, the logical controller 505 sends the generated UPCP data to the physical controllers 510 and 515.

As illustrated on the left side of FIG. 7, the physical controllers 510 and 515 each generates, from the received UPCP data, CPCP data for each of the managed switching elements 520-535 and sends the CPCP data to each of the managed switching elements 520-535. In some embodiments, the physical controllers 510 and 515 communicate with and configure the managed switching elements 520-535 through the OpenFlow or OVS APIs provided by the managed switching elements 520-535.

The physical controllers 510 and 515 of some embodiments generates and sends attachment data and slicing data for a WAN optimizer along with the CPCP data to the managed switching elements 520-535. In some embodiments, attachment data includes a tunnel type (e.g., a GRE tunnel, a CAPWAP tunnel, a WCCP tunnel, etc.) for the WAN optimizer 740 to use for sending and receiving network data (e.g., to and from an extender).

In some embodiments, the physical controller 515 generates the slicing data for the WAN optimizer 740 and pushes this data along with the WAN optimizer configuration data to the WAN optimizer 740 through the set of APIs. The slicing data of some embodiments includes a unique identifier associated with a WAN optimizer in a logical network. In some embodiments, a WAN optimizer can be used to implement (1) multiple WAN optimizer service instances for a particular logical network and/or (2) multiple WAN optimizer service instances for multiple different logical networks. When the WAN optimizer of some such embodiments receives network data that includes the unique identifier, the WAN optimizer identifies (e.g., using a table that the WAN optimizer maintains for mapping unique identifiers to WAN optimizer service instances) the WAN optimizer service instance associated with the unique identifier and uses the identified WAN optimizer service instance to process the packet.

For each of the managed switching elements 520-535, when the managed switching element receives the CPCP data, the managed switching element generates PFP data for implementing the LDPS. Instead of sending CPCP data, in some embodiments, the physical controllers 510 and 515 send the UPCP data to the managed switching elements 520-535. The managed switching elements 520-535 of some such embodiments each generates its own CPCP data from the UPCP data and then generates the PFP data from the generated CPCP data.

The right side of FIG. 7 shows that the network configuration data, which is provided to the logical controller 505 through a set of APIs, also includes WAN optimizer configuration data. As shown, the logical controller 505 receives the WAN optimizer configuration data and sends it to the physical controllers 510 and 515. Then, the physical controllers 510 and 515 forward the WAN optimizer configuration data and the attachment data and/or slicing data to the WAN optimizer 740 through a set of API calls.

Once the WAN optimizer 740 receives the WAN optimizer configuration data, the WAN optimizer 740 translates the WAN optimizer configuration data by creating a configuration of the WAN optimizer 740 that includes the manner in which the WAN optimizer 740 sends and receives network data (based on the attachment data) when the configuration is used. In addition, the WAN optimizer 740 binds (e.g., associates) the slicing data to the created WAN optimizer configuration so that the WAN optimizer 740 is able to apply the WAN optimizer configuration to network data that specifies (e.g., through a virtual local area network (VLAN) tag) the slicing data's unique identifier or another shorter unique identifier (e.g., represented by less bits) that is associated with the slicing data's unique identifier.

Figure 8:
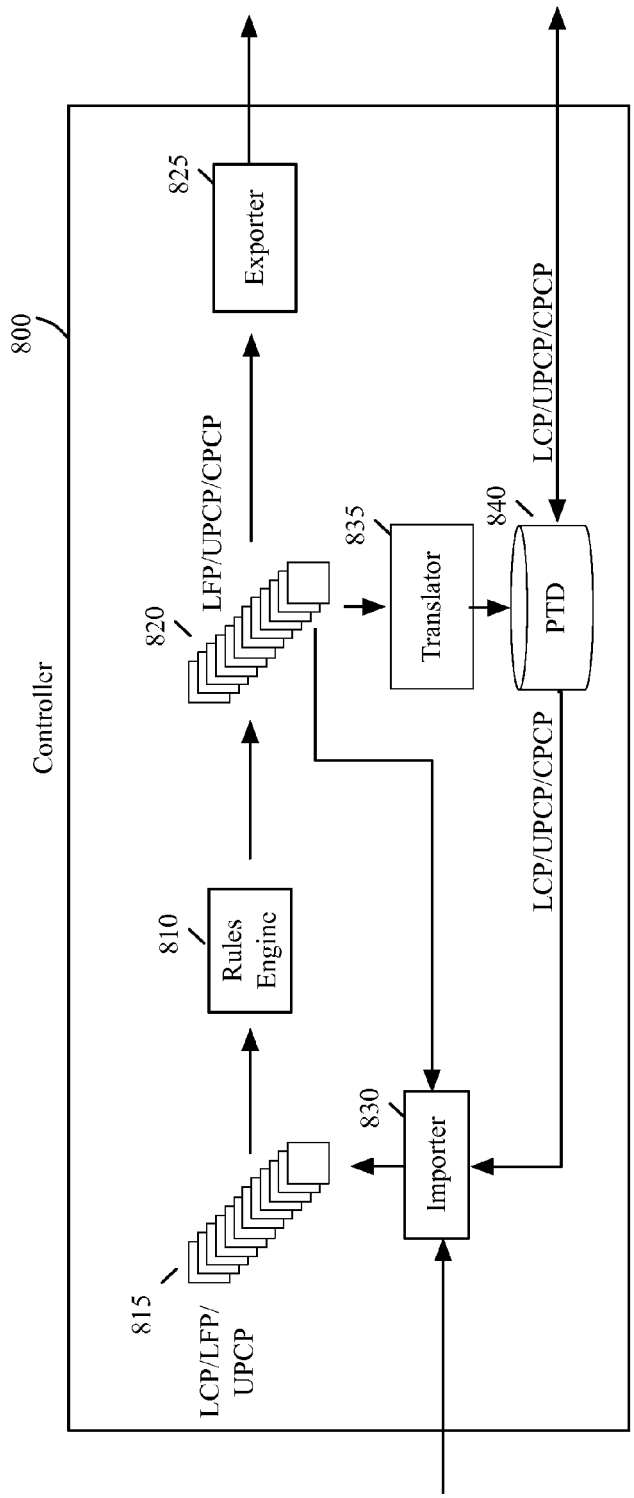
FIG. 8 illustrates an example architecture of a network controller of some embodiments.

FIG. 8 illustrates example architecture of a network controller (e.g., a logical controller or a physical controller) 800. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include WAN optimizer configuration data to be sent to another controller and/or a distributed WAN optimizer service instance. The network controller 800, as shown, includes input tables 815, a rules engine 810, output tables 820, an importer 830, an exporter 825, a translator 835, and a persistent data storage (PTD) 840.

In some embodiments, the input tables 815 include tables with different types of data depending on the role of the controller 800 in the network control system. For instance, when the controller 800 functions as a logical controller for a user's logical forwarding elements, the input tables 815 include LCP data and LFP data for the logical forwarding elements. When the controller 800 functions as a physical controller, the input tables 815 include LFP data. The input tables 815 also include WAN optimizer configuration data received from the user or another controller. The WAN optimizer configuration data is associated with a logical datapath set parameter that identifies the logical switching elements to which the WAN optimizer is to be integrated.

In addition to the input tables 815, the control application 800 includes other miscellaneous tables (not shown) that the rules engine 810 uses to gather inputs for its table mapping operations. These miscellaneous tables include constant tables that store defined values for constants that the rules engine 810 needs to perform its table mapping operations (e.g., the value 0, a dispatch port number for resubmits, etc.). The miscellaneous tables further include function tables that store functions that the rules engine 810 uses to calculate values to populate the output tables 820.

The rules engine 810 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 810 includes an event processor (not shown), several query plans (not shown), and a table processor (not shown). Each query plan is a set of rules that specifies a set of join operations that are to be performed upon the occurrence of an input table event. The event processor of the rules engine 810 detects the occurrence of each such event. In some embodiments, the event processor registers for callbacks with the input tables for notification of changes to the records in the input tables 815, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 820.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 815, the output tables 820 include tables with different types of data depending on the role of the controller 800. When the controller 800 functions as a logical controller, the output tables 815 include LFP data and UPCP data for the logical switching elements. When the controller 800 functions as a physical controller, the output tables 820 include CPCP data. Like the input tables, the output tables 815 may also include the WAN optimizer configuration data. Furthermore, the output tables 815 may include a slice identifier when the controller 800 functions as a physical controller.

In some embodiments, the output tables 820 can be grouped into several different categories. For instance, in some embodiments, the output tables 820 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 825 to export the change to another controller or a MSE. An output table can be an RE input table, a RE output table, or both an RE input table and a RE output table.

The exporter 825 detects changes to the RE output tables of the output tables 820. In some embodiments, the exporter registers for callbacks with the RE output tables for notification of changes to the records of the RE output tables. In such embodiments, the exporter 825 detects an output table event when it receives notification from a RE output table that one of its records has changed.

In response to a detected output table event, the exporter 825 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 800 does not keep in the output tables 820 the data for logical datapath sets that the controller is not responsible for managing (i.e., for logical networks managed by other logical controllers). However, such data is translated by the translator 835 into a format that can be stored in the PTD 840 and is then stored in the PTD. The PTD 840 propagates this data to PTDs of one or more other controllers so that those other controllers that are responsible for managing the logical datapath sets can process the data.

In some embodiments, the controller also brings the data stored in the output tables 820 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 830 interfaces with a number of different sources of input data and uses the input data to modify or create the input tables 810. The importer 820 of some embodiments receives the input data from another controller. The importer 820 also interfaces with the PTD 840 so that data received through the PTD from other controller instances can be translated and used as input data to modify or create the input tables 810. Moreover, the importer 820 also detects changes with the RE input tables in the output tables 830.

IV. Packet Processing

Figure 9:
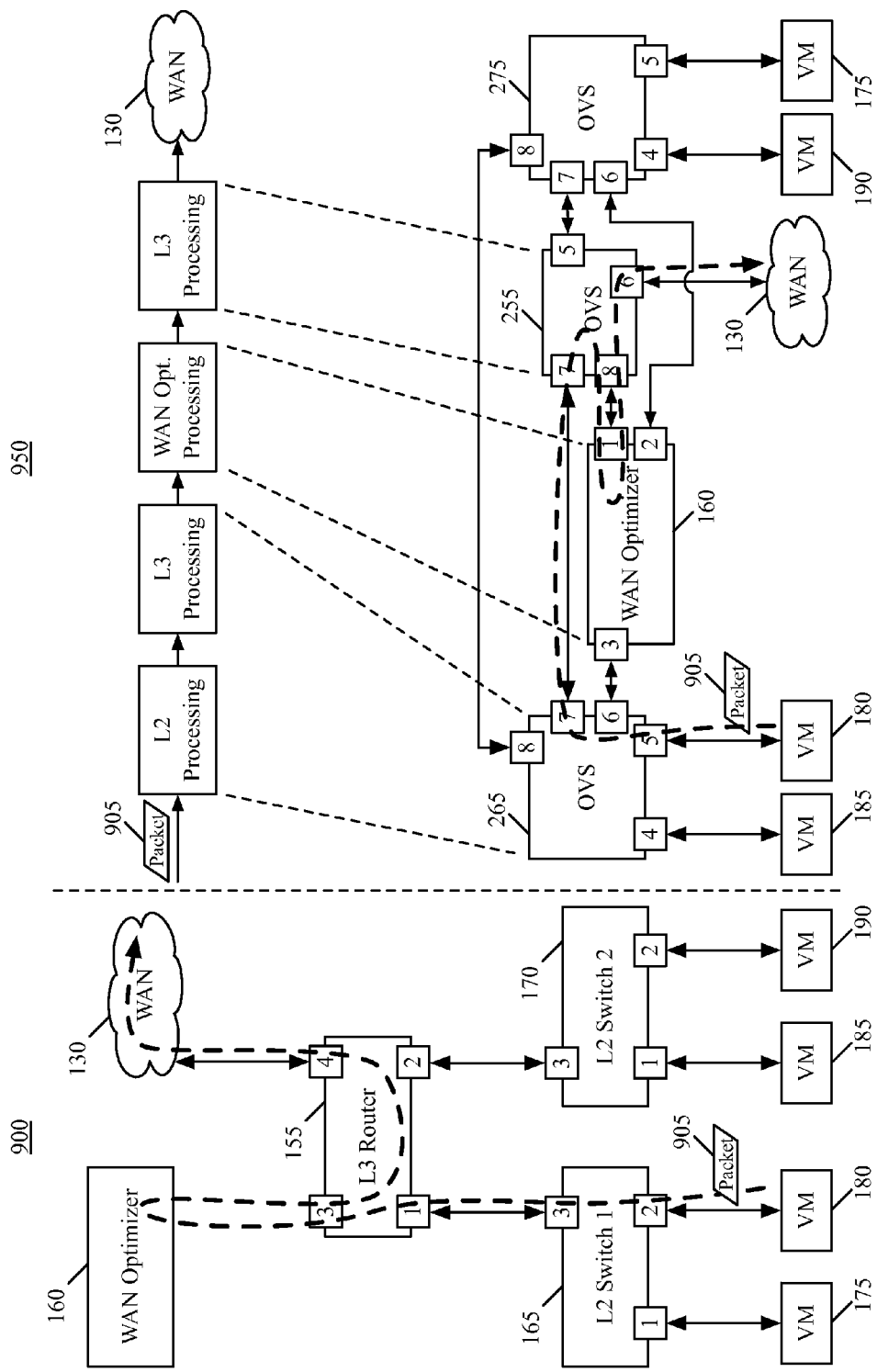
FIG. 9 conceptually illustrates an example logical processing of a packet through a logical network according to some embodiments of the invention.

FIG. 9 conceptually illustrates an example logical processing of a packet through a logical network 900 according to some embodiments of the invention. In particular, the left section of FIG. 9 illustrates a packet 905 traversing the logical network 900, which is a conceptual representation of an LDPS in some embodiments. Additionally, the right section of FIG. 9 illustrates a logical processing pipeline 950 for processing the packet 905 through the logical network 900 and the corresponding path of the packet 905 through a set of managed network elements used for implementing the logical network 900.

The logical network 900 includes the WAN optimizer 160, the WAN 130, the L3 router 155, the L2 switches 165 and 170, and the VMs 170-190. The arrangement of the WAN optimizer 905 in the logical network 900 is a one-arm deployment or one-armed out-of-path deployment that is similar to the WAN optimizer deployment described above by reference to FIG. 1.

As indicated by a dotted line in the left section of FIG. 9, the path of the packet 905 in this example starts from the VM 180 and travels through the WAN optimizer 160 for processing and then through the L3 router 155 and over the WAN 130. In particular, the packet 905 travels from the VM 180 through logical port 2 of the L2 switch 165 and out the logical port 3 of the L2 switch 165 to the logical port 1 of the L3 router 155. Once at the L3 router 155, the packet 905 travels out the logical port 3 of the L3 router 155 and through of the WAN optimizer 160. After the WAN optimizer 160 optimizes the packet 905 data (e.g., compresses the data), the WAN optimizer 160 forwards the packet 905 back to the logical port 3 of the L3 router 155. The L3 router 155 then routes the packet 905 out of its logical port 4 and over the WAN 130.

In some embodiments, the path of network data through the logical network 900 is based on policy-based routing data that the user provides as part of the network configuration data. Specifically, in this example, the user provides a policy specifying that network data sent from the VM 180 (e.g., packets that have the VM 180's IP address as the packet's source IP address) and over the WAN 130 is to be routed through the WAN optimizer 160 for optimizing. Additional and/or different policies may be used in different embodiments. For instance, a policy may specify that network data sent from the VM 180 (e.g., packets that have the VM 180's IP address as the packet's source IP address) and over the WAN 130 to a particular host (e.g., the host 105 in FIG. 1) is to be routed through the WAN optimizer 160 for optimizing. Another policy might specify that network data sent from VMs in the logical broadcast domain managed by the L2 switch 165 (the VMs 175 and 180 in this example).

As mentioned above, the right section of FIG. 9 illustrates the logical processing of the packet 905 through the logical network 900 and the path the packet 905 travels through a set of managed network elements that is used for implementing the logical network 900. As illustrated, the set of managed network elements for this example includes the OVSs 265 and 275, the WAN optimizer 160, and the OVS 255, which is part of the extender 250 (not shown in FIG. 9).

Since the OVS 265 is the edge switching element that is directly coupled to the VM 180, the OVS 265 in some embodiments is responsible for performing the logical processing (referred to as first-hop processing) of the packet 905 through the logical network 900 from the VM 180 to the WAN optimizer 160. In this example, the logical port 2 of the L2 switch 165 corresponds to the physical port 5 of the OVS 265. When the OVS 265 receives the packet at the physical port 5, the OVS 265 processes the packet 905 through the logical network 900 using the OVS 265's forwarding plane (e.g., a set of forwarding tables).

After the OVS 265 performs the logical L2 processing (e.g., determining a forwarding decision through the L2 switch 165) and the logical L3 processing (e.g., determining a routing decision through the L3 router 155) on the packet 905, the OVS 265 routes the packet 905 to a physical network element based on the logical L2 and L3 processing. For this example, the L2 and L3 processing of the packet 905 results in a decision to route the packet 905 to the logical port 3 of the L3 router 155, which corresponds to the physical port 1 of the WAN optimizer 160. Based on the logical L2 and L3 processing, the OVS 265 forwards the packet 905 through a tunnel (e.g., a GRE tunnel, a CAPWAP tunnel, a WCCP tunnel, etc.) out of the physical port 7 of the OVS 265 to the physical port 7 of the OVS 255, which in turn forwards the packet 905 out the physical port 8 of the OVS 255 to the WAN optimizer 160's physical port 1 through a tunnel (e.g., a GRE tunnel, a CAPWAP tunnel, a WCCP tunnel, etc.).

When the WAN optimizer 160 receives the packet 905 at its physical port 1, the WAN optimizer 160 processes the packet according to the WAN optimizer configuration data that the user provides as part of the network configuration data. As mentioned above, slicing data, which includes a unique identifier associated with a WAN optimizer in a logical network, allows a WAN optimizer to implement (1) multiple WAN optimizers in a particular logical network and/or (2) multiple WAN optimizers for multiple different logical networks. To process the packet 905, the WAN optimizer 160 identifies the unique identifier specified in the packet 905 (e.g., in the VLAN tag field) and identifies the WAN optimizer configuration that corresponds to the unique identifier. The WAN optimizer 160 uses the identified WAN optimizer configuration to process the packet 905 and send the packet 905 out of its physical port 1, through the tunnel between the WAN optimizer 160 and the OVS 255, and back to the physical port 8 of the OVS 255. Instead of processing the packet 905, the WAN optimizer 160 of some embodiments generates a copy of the packet 905, processes the copy of the packet 905, and sends the processed copy to the OVS 255. In other words, the OVS 255 receives back from the WAN optimizer 160 a new packet that is generated by the WAN optimizer 160.

Once the OVS 255 receives the packet 905 back from the WAN optimizer 160, the OVS 255 performs L3 processing on the packet 905 (or a copy of the packet 905) in order to determine a routing decision through the L3 router 155. In this example, the OVS 255's L3 processing yields a decision to route the packet 905 out the logical port 4 of the L3 router 155, which corresponds to the physical port 6 of the OVS 255, out to the WAN 130. Accordingly, the OVS 255 forwards the packet 905 out of its physical port 6 over the WAN 130.

In some embodiments, the forwarding decisions specified in the OVS 255's forwarding plane are derived from attachment and slicing data for the WAN optimizer 160 and either (1) CPCP data that the OVS 255 receives from a physical controller or (2) CPCP data that the OVS 255 generates based on UPCP data received from the physical controller. In addition, the forwarding decisions specified in the OVS 265's forwarding plane are similarly derived from attachment and slicing data for the WAN optimizer 160 and either (1) CPCP data that the OVS 265 receives from a physical controller or (2) CPCP data that the OVS 265 generates based on UPCP data received from the physical controller.

Figure 10:
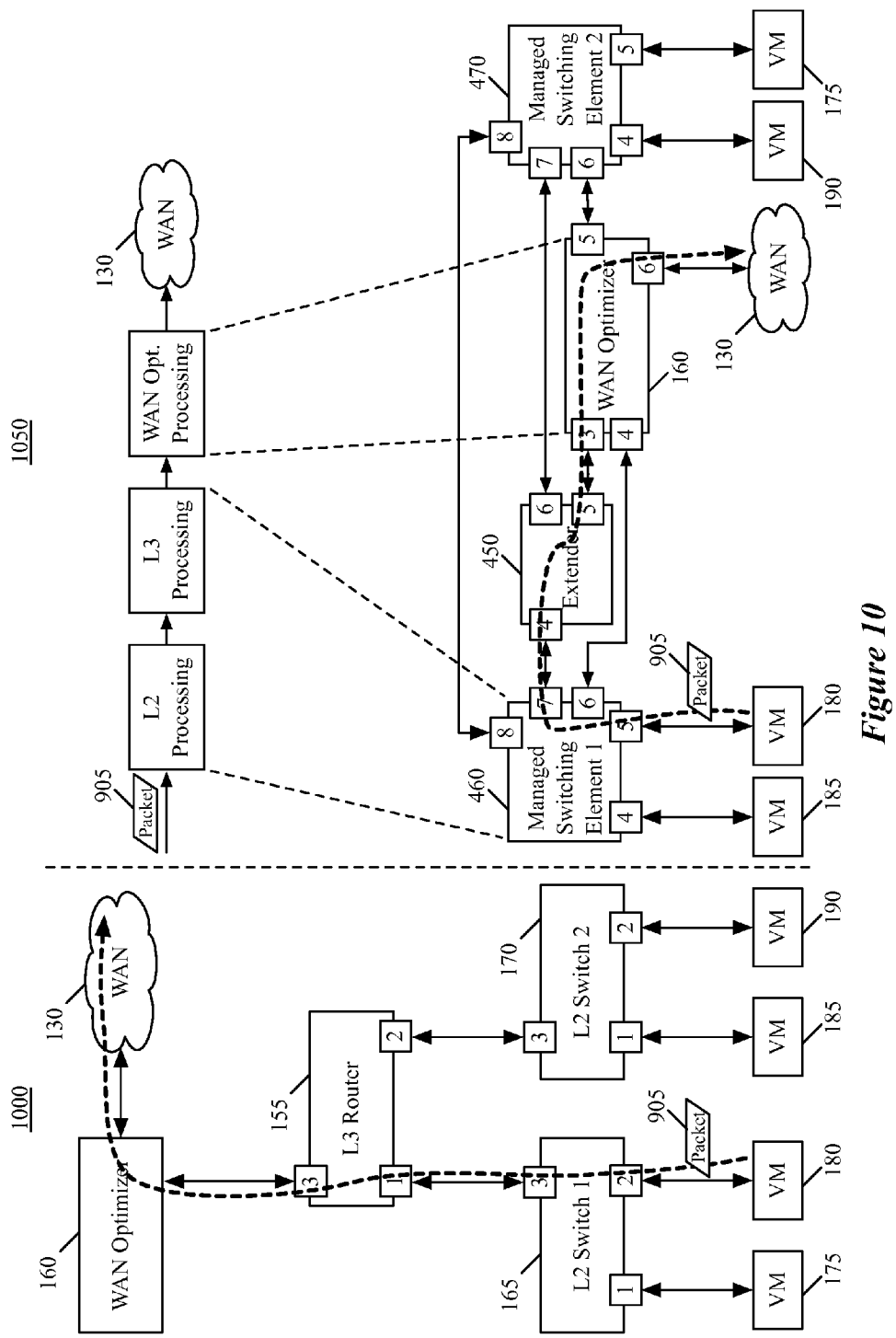
FIG. 10 conceptually illustrates another example logical processing of a packet through a logical network according to some embodiments of the invention.

FIG. 10 conceptually illustrates another example logical processing of a packet through a logical network 1000 according to some embodiments of the invention. Specifically, the logical processing example illustrated in FIG. 10 is similar to the logical processing illustrated in FIG. 9 except that FIG. 10 illustrates the logical processing of the packet 905 through a logical network that employs a physical-in-band deployment or in-line deployment of the WAN optimizer 160.

As shown, the left section of FIG. 10 illustrates the packet 905 traversing the logical network 1000, which is a conceptual representation of an LDPS in some embodiments. Furthermore, the right section of FIG. 10 illustrates a logical processing pipeline 1050 for processing the packet 905 through the logical network 1000 and the corresponding path of the packet 905 through a set of managed network elements used for implementing the logical network 1000.

As illustrated in FIG. 10, the logical network 1000 includes the WAN optimizer 160, the WAN 130, the L3 router 155, the L2 switches 165 and 170, and the VMs 170-190. As noted above, the arrangement of the WAN optimizer 905 in the logical network 1000 is a physical-in-arm deployment or in-line deployment that is similar to the WAN optimizer deployment described above by reference to FIG. 3.

A dotted line in the left section of FIG. 10 shows the path of the packet 905 in this example as starting from the VM 180 and traveling through the WAN optimizer 160 for processing and then over the WAN 130. In particular, the packet 905 travels from the VM 180 through logical port 2 of the L2 switch 165 and out the logical port 3 of the L2 switch 165 to the logical port 1 of the L3 router 155. The packet then travels through the L3 router 155 and out the logical port 3 of the L3 router 155 and through the WAN optimizer 160. After the WAN optimizer 160 optimizes the packet 905 data (e.g., compresses the data), the WAN optimizer 160 forwards the packet 905 over the WAN 130.

The path of network data through the logical network 1000 is in some embodiments based on policy-based routing data that the user provides as part of the network configuration data. In particular, the user in this example provides a policy specifying that network data sent from the VM 180 (e.g., packets that have the VM 180's IP address as the packet's source IP address) and over the WAN 130 is to be routed through the WAN optimizer 160 for optimizing. Additional and/or different policies may be used in different embodiments. For example, a policy may specify that network data sent from the VM 180 (e.g., packets that have the VM 180's IP address as the packet's source IP address) and over the WAN 130 to a particular host (e.g., the host 105 in FIG. 1) is to be routed through the WAN optimizer 160 for optimizing. Another policy might specify that network data sent from VMs in the logical broadcast domain managed by the L2 switch 165 (the VMs 175 and 180 in this example).

As mentioned above, the right section of FIG. 10 illustrates the logical processing of the packet 905 through the logical network 1000 and the path the packet 905 travels through a set of managed network elements that is used for implementing the logical network 1000. As shown, the set of managed network elements in this example includes the managed switching elements 460 and 470, the WAN optimizer 160, and the extender 450.

Since the managed switching element 460 is the edge switching element that is directly coupled to the VM 180, the managed switching element 460 in some embodiments is responsible for performing the logical processing (referred to as first-hop processing) of the packet 905 through the logical network 1000 from the VM 180 to the WAN optimizer 160. In this example, the logical port 2 of the L2 switch 165 corresponds to the physical port 5 of the managed switching element 460. When the managed switching element 460 receives the packet at the physical port 5, the managed switching element 460 processes the packet 905 through the logical network 1000 using the managed switching element 460's forwarding plane (e.g., a set of forwarding tables).

After the managed switching element 460 performs the logical L2 processing (e.g., determining a forwarding decision through the L2 switch 165) and the logical L3 processing (e.g., determining a routing decision through the L3 router 155) on the packet 905, the managed switching element 460 routes the packet 905 to a physical network element based on the logical L2 and L3 processing. In this example, the L2 and L3 processing of the packet 905 results in a decision to route the packet 905 out the logical port 3 of the L3 router 155, which corresponds to the physical port 3 of the WAN optimizer 160. Based on the logical L2 and L3 processing, the managed switching element 460 forwards the packet 905 through a tunnel (e.g., a GRE tunnel, a CAPWAP tunnel, a WCCP tunnel, etc.) out of the physical port 7 of the managed switching element 460 to the physical port 4 of the extender 450, which in turn forwards the packet 905 out the physical port 5 of the extender 450 to the WAN optimizer 160's physical port 3 through a tunnel (e.g., a GRE tunnel, a CAPWAP tunnel, a WCCP tunnel, etc.).

When the WAN optimizer 160 receives the packet 905 at its physical port 3, the WAN optimizer 160 processes the packet according to the WAN optimizer configuration data that the user provides as part of the network configuration data. As noted above, slicing data, which includes a unique identifier associated with a WAN optimizer in a logical network, allows a WAN optimizer to implement (1) multiple WAN optimizers in a particular logical network and/or (2) multiple WAN optimizers for multiple different logical networks. To process the packet 905, the WAN optimizer 160 identifies the unique identifier specified in the packet 905 (e.g., in the VLAN tag field) and identifies the WAN optimizer configuration that corresponds to the unique identifier. The WAN optimizer 160 uses the identified WAN optimizer configuration to process the packet 905 and send the packet 905 out of its physical port 6 and over the WAN 130.

In some embodiments, the forwarding decisions specified in the managed switching element 460's forwarding plane are derived from attachment and slicing data for the WAN optimizer 160 and either (1) CPCP data that the managed switching element 460 receives from a physical controller or (2) CPCP data that the managed switching element 460 generates based on UPCP data received from the physical controller. Similarly, the forwarding decisions specified in the extender 450's forwarding plane are derived from attachment and slicing data for the WAN optimizer 160 and either (1) CPCP data that the extender 450 receives from a physical controller or (2) CPCP data that the extender 450 generates based on UPCP data received from the physical controller.

V. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
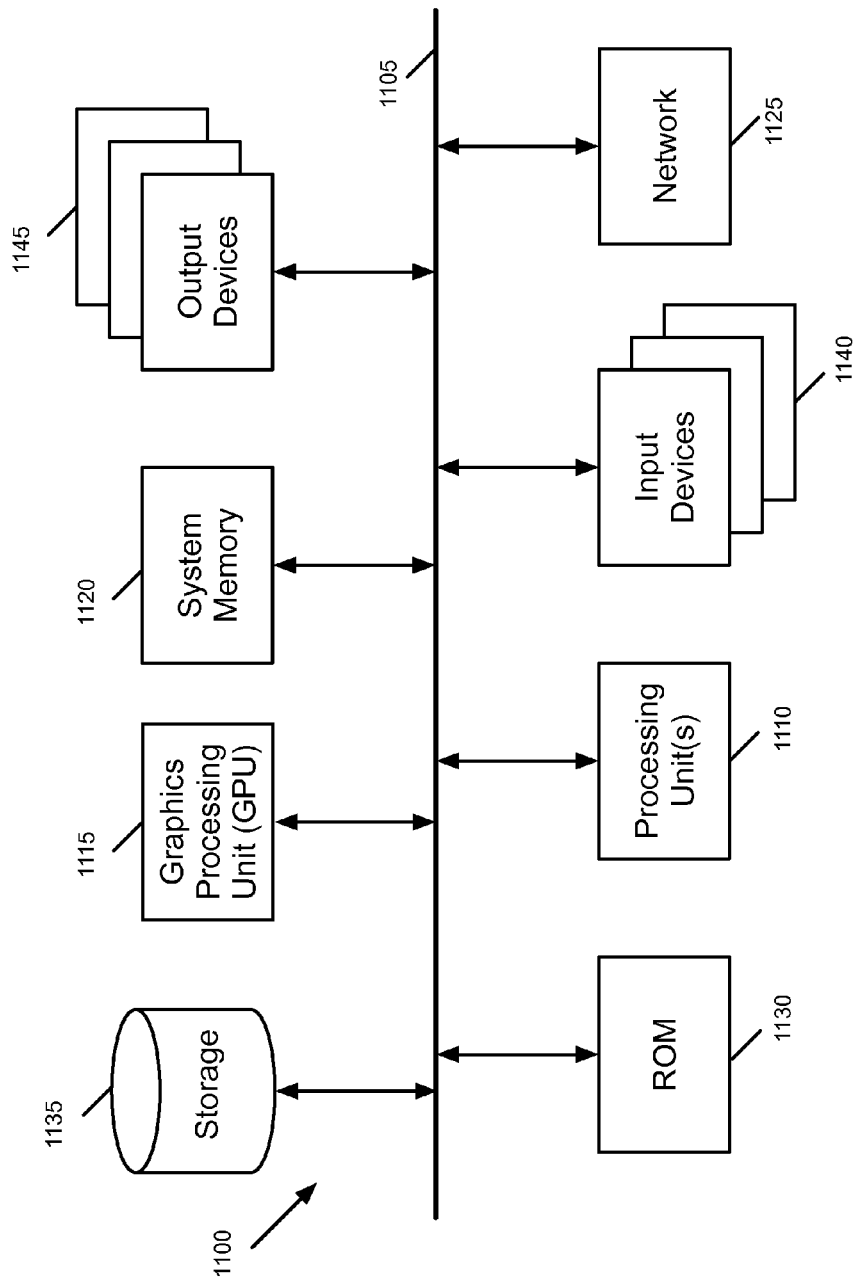
FIG. 11 conceptually illustrates an electronic device with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium of a controller of a network control system, the non-transitory machine readable medium storing sets of instructions for:

receiving network configuration data that specifies a logical network comprising (i) a plurality of logical forwarding elements (LFEs) that logically connect a plurality of end machines to each other, the plurality of end machines residing on a plurality of host machines, wherein each of the host machines hosts a subset of the end machines and (ii) a logical wide area network (WAN) optimizer for optimizing network data transmitted out of the logical network, the network configuration data comprising a configuration for the logical WAN optimizer;

generating data for implementing the LFEs, the generated data for distribution to a plurality of additional network controllers in the network control system, each additional network controller for managing at least one managed forwarding element (MFE) that implements the LFEs to which the end machines residing on the same host machine as the MFE logically connect; and distributing the configuration for the logical WAN optimizer to a particular network controller in the network control system that manages a WAN optimizer machine, wherein the WAN optimizer machine, based on the configuration for the logical WAN optimizer received from the particular network controller, instantiates a WAN optimizer instance to implement the logical WAN optimizer as one of a plurality of logical WAN optimizers implemented as WAN optimizer instances on the WAN optimizer machine, wherein each logical WAN optimizer instantiated on the WAN optimizer machine couples to a different logical network.

2. The non-transitory machine readable medium of claim 1, wherein the logical WAN optimizer is a first WAN optimizer, wherein the configuration for the logical WAN optimizer is for optimizing the network data to be transmitted out of the logical network to a second WAN optimizer over a WAN.

3. The non-transitory machine readable medium of claim 2, wherein the WAN optimizer instance sends the optimized network data to the logical network for the logical network to transmit the network data to the second WAN optimizer over the WAN.

4. The non-transitory machine readable medium of claim 2, wherein the first WAN optimizer is located in a multi-tenant data center, wherein the second WAN optimizer is part of a private data center.

5. The non-transitory machine readable medium of claim 2, wherein the network data is destined for a network host coupled to the second WAN optimizer.

6. The non-transitory machine readable medium of claim 1, wherein the configuration for the logical WAN optimizer specifies a manner of optimizing the network data that passes through the logical WAN optimizer.

7. The non-transitory machine readable medium of claim 6, wherein the specified manner comprises a manner of compressing the network data that passes through the logical WAN optimizer.

8. The non-transitory machine readable medium of claim 7, wherein the second WAN optimizer decompresses the network data that was compressed by the logical WAN optimizer.

9. The non-transitory machine readable medium of claim 6, wherein the specified manner comprises a manner of performing data duplication on the network data.

10. The non-transitory machine readable medium of claim 1, wherein the network data is transmitted out through the WAN optimizer instance irrespective of whether the network data is specified to be optimized by the WAN optimizer.

11. The non-transitory machine readable medium of claim 1, wherein the configuration for the logical WAN optimizer comprises a set of policies for directing the network data through the logical network and to the logical WAN optimizer.

12. The non-transitory machine readable medium of claim 1, wherein the WAN optimizer machine is implemented by an end machine of the logical network.

13. A method for configuring a logical wide area network (WAN) optimizer in a logical network comprising a plurality of logical forwarding elements (LFEs), the method comprising:

receiving a configuration for the logical WAN optimizer that specifies packet filtering rules for optimizing network data transmitted out of the logical network;

generating data for implementing the plurality of LFEs that logically connect a plurality of end machines to each other, the plurality of end machines residing on a plurality of host machines, wherein each of the host machines hosts a subset of the end machines, the generated data for distribution to a plurality of network controllers each of which manages at least one managed forwarding element that implements the logical forwarding elements to which the end machines residing on the same host machine as the managed forwarding element logically connect; and distributing the configuration for the logical WAN optimizer to a particular network controller that manages a WAN optimizer machine, wherein the WAN optimizer machine, based on the configuration for the logical WAN optimizer received from the particular network controller, instantiates a WAN optimizer instance to implement the logical WAN optimizer as one of a plurality of logical WAN optimizers implemented as WAN optimizer instances on the WAN optimizer machine, wherein each logical WAN optimizer instantiated on the WAN optimizer machine couples to a different logical network.

14. The method of claim 13, wherein the packet filtering rules comprise a source Internet Protocol (IP) subnet.

15. The method of claim 13, wherein the packet filtering rules comprise a destination IP subnet.

16. The method of claim 13, wherein the packet filtering rules comprise a set of ports.

17. The method of claim 13, wherein the packet filtering rules comprise data to specify a type of tunnel to be used between the WAN optimizer machine and the managed forwarding elements for transmitting the network data.

18. The method of claim 13, wherein the WAN optimizer machine is implemented by an end machine in the logical network.

19. The method of claim 18, wherein the end machine is a virtual machine (VM), wherein the particular network controller distributes the configuration data to the VM through a set of application programming interfaces (APIs) that is provided by the VM.

20. The method of claim 13, wherein each managed forwarding element is a software forwarding element operating on the host machine.

21. The method of claim 20, wherein the managed forwarding element implements the LFEs, to which the end machines residing on the host logically connect, by converting the generated data received from the controller that manages the managed forwarding element to physical forwarding plane that specifies a set of forwarding rules for forwarding data packets between the end machines residing on the host.

22. The method of claim 21, wherein the physical forwarding plane comprises a set of forwarding tables, wherein the managed forwarding element uses a table mapping engine to generate the set of forwarding tables.

23. The method of claim 21, wherein the controller that manages the managed forwarding element is a controller computer separate from the host machine on which the managed forwarding element operates.

* * * * *